United States Patent
Stern et al.

(10) Patent No.: US 10,625,209 B2
(45) Date of Patent: *Apr. 21, 2020

(54) METHODS AND SYSTEMS FOR CARRYING OUT A PH-INFLUENCED CHEMICAL AND/OR BIOLOGICAL REACTION

(71) Applicant: Massachusetts Institute of Technology, Cambridge, MA (US)

(72) Inventors: Michael C. Stern, Cambridge, MA (US); Fritz Simeon, Quincy, MA (US); Trevor Alan Hatton, Sudbury, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 104 days.

This patent is subject to a terminal disclaimer.

(21) Appl. No.: 14/985,357

(22) Filed: Dec. 30, 2015

(65) Prior Publication Data

US 2016/0114290 A1    Apr. 28, 2016

Related U.S. Application Data

(63) Continuation of application No. 13/598,321, filed on Aug. 29, 2012, now Pat. No. 9,302,219.

(Continued)

(51) Int. Cl.
| | |
|---|---|
| *B01D 53/96* | (2006.01) |
| *C25B 9/08* | (2006.01) |
| *C25B 11/04* | (2006.01) |
| *B01D 53/32* | (2006.01) |
| *B01D 53/62* | (2006.01) |

(Continued)

(52) U.S. Cl.
CPC ......... *B01D 53/965* (2013.01); *B01D 53/326* (2013.01); *B01D 53/62* (2013.01); *C25B 1/00* (2013.01); *C25B 9/08* (2013.01); *C25B 11/04* (2013.01); *B01D 53/1475* (2013.01); *B01D 2252/20421* (2013.01); *B01D 2252/602* (2013.01); *B01D 2257/504* (2013.01); *B01D 2258/0283* (2013.01); *B01D 2259/80* (2013.01);

(Continued)

(58) Field of Classification Search
None
See application file for complete search history.

(56) References Cited

U.S. PATENT DOCUMENTS

| | | | |
|---|---|---|---|
| 3,065,156 | A | 11/1962 | Wade et al. |
| 3,554,691 | A | 1/1971 | Kuo et al. |

(Continued)

FOREIGN PATENT DOCUMENTS

| | | |
|---|---|---|
| EP | 0 328 782 A1 | 8/1989 |
| WO | WO 1993/007650 A1 | 4/1993 |
| WO | WO 2013/033173 A1 | 3/2013 |

OTHER PUBLICATIONS

International Search Report and Written Opinion for PCT/US2012/052811 dated Dec. 14, 2012.

(Continued)

*Primary Examiner* — Harry D Wilkins, III
(74) *Attorney, Agent, or Firm* — Wolf, Greenfield & Sacks, P.C.

(57) ABSTRACT

The present invention generally relates to methods and systems for carrying out a pH-influenced chemical and/or biological reaction. In some embodiments, the pH-influenced reaction involves the conversion of $CO_2$ to a dissolved species.

17 Claims, 10 Drawing Sheets

Related U.S. Application Data

(60) Provisional application No. 61/528,449, filed on Aug. 29, 2011.

(51) Int. Cl.
*C25B 1/00* (2006.01)
*B01D 53/14* (2006.01)

(52) U.S. Cl.
CPC ............... *Y02C 10/04* (2013.01); *Y02C 10/06* (2013.01); *Y02P 20/152* (2015.11)

(56) References Cited

U.S. PATENT DOCUMENTS

| | | | |
|---|---|---|---|
| 4,789,610 | A | 12/1988 | Kondo et al. |
| 5,324,403 | A | 6/1994 | Kennedy et al. |
| 5,478,448 | A | 12/1995 | Schneider |
| 6,129,832 | A | 10/2000 | Fuhr et al. |
| 6,660,071 | B2 | 12/2003 | Yoshida et al. |
| 7,381,648 | B2 | 6/2008 | Kaufman et al. |
| 7,887,694 | B2 | 2/2011 | Constantz et al. |
| 9,302,219 | B2 * | 4/2016 | Stern .................... B01D 53/326 |
| 9,567,678 | B2 * | 2/2017 | Eltayeb .................. B01J 19/088 |
| 2008/0171268 | A1 | 7/2008 | Yazami |
| 2010/0059377 | A1 | 3/2010 | Littau et al. |
| 2010/0236242 | A1 | 9/2010 | Farsad et al. |
| 2012/0055808 | A1 | 3/2012 | Martin et al. |
| 2013/0058857 | A1 | 3/2013 | Stern et al. |
| 2014/0246324 | A1 | 9/2014 | Baskaran et al. |
| 2014/0271434 | A1 | 9/2014 | Buttry |
| 2015/0110694 | A1 | 4/2015 | Eltayeb et al. |
| 2017/0209846 | A1 | 7/2017 | Eltayeb et al. |

OTHER PUBLICATIONS

International Preliminary Report on Patentability for PCT/US2012/052811 dated Mar. 13, 2014.
International Search Report and Written Opinion for PCT/US2015/053743 dated Jan. 20, 2016.
International Preliminary Report on Patentability for PCT/US2015/053743 dated Apr. 13, 2017.
Appel et al., Concentration of carbon dioxide by electrochemically modulated complexation with a binuclear copper complex. Inorg Chem. May 2, 2005;44(9):3046-56.
Eltayeb et al., Electrochemically-Mediated Amine Recovery (EMAR) for Large-Scale CO2 Capture. University of Texas 2nd Conference on Carbon Capture and Storage, Austin TX. Jan. 2014: 25 pages.
Eltayeb et al., Energetics of Electrochemically-Mediated Amine Regeneration. International Conference on Greenhouse Gas Technologies (GHGT-12), Austin TX. Oct. 2014: 26 pages.
Eltayeb et al., Energetics of Electrochemically-Mediated Amine Regeneration. Energy Procedia. 2014;63:595-604. doi:10.1016/j.egypro.2014.11.064.
Eltayeb et al., Energetics of Electrochemically-Mediated Amine Regeneration. MIT Carbon Sequestration Forum, Cambridge MA. Nov. 2014: 20 pages.
Eltayeb et al., High-Efficiency Carbon Dioxide Capture. MIT Deshpande Center Open House Poster, Cambridge MA. Dec. 9, 2014.
Frasconi et al., Electrochemically stimulated pH changes: a route to control chemical reactivity. J Am Chem Soc. Feb. 17, 2010;132(6):2029-36. doi: 10.1021/ja9094796.
Guin et al., Electrochemical Reduction of Quinones in Different Media: A Review. International Journal of Electrochemistry. 2011, Article ID 816202: 22 pages.
Okano et al., A new method of pH control by use of a polypyrrole coated electrode. J Electroanal Chem. Apr. 25, 1985;185(2):393-9.
Pascal et al., New concept to remove heavy metals from liquid waste based on electrochemical pH-switchable immobilized ligands. Applied Surface Science. 2007;253:3263-9.
Quan et al., Voltammetry of quinones in unbuffered aqueous solution: reassessing the roles of proton transfer and hydrogen bonding in the aqueous electrochemistry of quinones. J Am Chem Soc. Oct. 24, 2007;129(42):12847-56. Epub Oct. 2, 2007.
Sawai et al., Electrical control of the volume of pH-sensitive micro-gels. J Electroanal Chem. Jan. 25, 1991;297(2):399-407.
Sawai et al., Electrical modulation of the solution pH near polyaniline and its composite electrodes. J Electroanal Chem. Apr. 25, 1990;283(1-2):221-30.
Scovazzo et al., Electrochemical Separation and Concentration of <1% Carbon Dioxide from Nitrogen. Journal of the Electrochemical Society. Apr. 2003;150(5):D91-8.
Spinu et al., Electrochemical pH Control in Hydroponic Systems. Acta Hort. (ISHS). 1998;456:275-82. http://www.actahort.org/books/456/456_32.htm.
Stauffer, A new way to capture CO2 emissions: Lower costs, easier installation. MIT Energy Initiative, Energy Futures. Spring 2014: 19-23. Last accessed at <https://mitei.mit.edu/publications/energy-futures-magazine/energy-futures-spring-2014> Dec. 29, 2014.
Stern et al., An Electrochemically-Mediated Gas Separation Process for Carbon Abatement. Energy Procedia. 2013;37:1172-9. doi:10.1016/j.egypro.2013.05.214.
Stern et al., Electrochemical Redox Flow Devices for the Electrically Driven Scrubbing of Acid Gases. AIChE Fall 2011 Conference, Minneapolis, MN, Oct. 20, 2011.
Stern et al., Electrochemical Strategies for Reduction of Greenhouse Gas Emissions. AIChE Annual Meeting, San Francisco CA. Nov. 2013: 16 pages.
Stern et al., Electrochemically Mediated Separation for Carbon Capture. Energy Procedia. 2011;4:860-7. doi:10.1016/j.egypro.2011.01.130.
Stern et al., Electrochemically-Mediated Amine Regeneration (EMAR) for CO2 Separation. ACS Fall Meeting, Industrial and Engineering Chemistry Division, Graduate Student Award Symposium, Indianapolis, IN. Sep. 10, 2013.
Stern et al., Electrochemically-Mediated Amine Regeneration (EMAR) for CO2 Separation. ACS Spring 2013 Meeting, New Orleans, LA. Apr. 7, 2013.
Stern et al., Electrochemically-Mediated Amine Regeneration for Carbon Dioxide Scrubbing Processes. AIChE Fall 2012 Conference, Pittsburgh, PA, Oct. 29, 2012. No. 272305.
Stern et al., Electrochemically-Mediated Amine Regeneration for CO2 Separation from Flue Gases. ARPA-e Showcase Poster Presentation. Washington, DC. Feb. 25-27, 2013.
Stern et al., Electrochemically-Mediated Separations for Carbon Mitigation. US Department of Energy, National Energy Technology Laboratory CO2 Capture Technology Meeting. Poster Presentation. Pittsburgh, Pennsylvania. Aug. 22-26, 2011.
Stern et al., Post-Combustion Carbon Dioxide Capture Using Electrochemically Mediated Amine Regeneration. Energy Environ Sci. 2013;6(8):2505-17. doi:10.1039/C3EE41165F.
Stern et al., Taking Charge of Carbon Capture E-MAR (Electrochemically-Mediated Amine Regeneration). ARPA-e Showcase Poster Presentation. Washington, DC. Feb. 27-29, 2012.
Stern et al., What is an Electrochemically Mediated Separation Process? ARPA-e Showcase Poster Presentation. Washington, DC. Feb. 28-Mar. 2, 2011.
Stern, A graduate student's perspective on carbon mitigation. Separations Technology VIII, Kona, HI, Dec. 10, 2010.
Stern, Electrochemically-Mediated Amine Regeneration for Carbon Dioxide Separations. Doctoral Thesis, Massachusetts Institute of Technology. Feb. 2014.
Xu et al., Design and Synthesis of a New Conjugated Polyelectrolyte as a Reversible pH Sensor. Macromolecular Rapid Communications. Mar. 3, 2008;29(5):390-5.
Yeh et al., Removal of Cu-EDTA compounds via electrochemical process with coagulation. Water Research. Feb. 1995;29(2):597-9.

* cited by examiner

US 10,625,209 B2

METHODS AND SYSTEMS FOR CARRYING OUT A PH-INFLUENCED CHEMICAL AND/OR BIOLOGICAL REACTION

RELATED APPLICATIONS

This application is a continuation of U.S. patent application Ser. No. 13/598,321, filed Aug. 29, 2012, by Stern et al., which claims the benefit of U.S. Provisional Patent Application Ser. No. 61/528,449, filed Aug. 29, 2011, by Stern et al., each of which is incorporated herein by reference in its entirety for all purposes.

STATEMENT REGARDING FEDERALLY SPONSORED RESEARCH OR DEVELOPMENT

This invention was made with government support under Grant No. DE-AR0000083, awarded by the Department of Energy. The government has certain rights in this invention.

FIELD OF THE INVENTION

The present invention generally relates to methods and systems for carrying out a pH-influenced chemical and/or biological reaction. In some embodiments, the pH-influenced reaction involves the conversion of $CO_2$ to a dissolved species.

BACKGROUND OF THE INVENTION

A large number of chemical and biological reactions are pH-influenced. That is, the pH of a reaction environment influences the rate, selectivity, etc., of the chemical and/or biological reaction. Current methods/systems for controlling the pH of a reaction environment include sequential addition of an acid and/or base and selective water hydrolysis (e.g., with use of a membrane). However, current methods/systems have many disadvantages, including the need to replenish reagents (e.g., acid and/or base), inaccurate and/or imprecise pH changes, and irreversibility. Accordingly, improved methods and/or systems are needed.

SUMMARY OF THE INVENTION

In some embodiments, a system for carrying out a pH-influenced chemical and/or biological reaction is provided comprising a pH-adjustment zone comprising a solution containing a complexation agent capable of associating and/or disassociating an acid and/or base to and/or from the solution upon exposure to an electrical potential; and a reaction zone in fluid connection with the pH adjustment zone, wherein the reaction zone comprises components and reagents for carrying out a pH-influenced chemical and/or biological reaction.

In some embodiments, a system for carrying out a pH-influenced chemical and/or biological reaction is provided comprising a pH-adjustment zone, comprising a solution and an electrode exposed to the solution, wherein at least 30% of the electrode by weight comprises a complexation agent capable of associating and/or disassociating an acid and/or base to and/or from the solution upon exposure to an electrical potential; and a reaction zone in fluid connection with the pH-adjustment zone, wherein the reaction zone comprises components and reagents for carrying out a pH-influenced chemical and/or biological reaction.

In some embodiments, a system is provided comprising a pH-adjustment zone comprising a solution and a complexation agent in contact with the solution, wherein the complexation agent is capable of associating and/or disassociating an acid and/or base to and/or from the solution upon exposure to an electrical potential; and a reaction zone in fluid communication with the pH-adjustment zone, wherein the reaction zone comprises a $CO_2$ absorption column.

In some embodiments, a method is provided comprising providing a system comprising a pH-adjustment zone and a reaction zone in fluid connection with the pH-adjustment zone, wherein the pH-adjustment comprises a complexation agent and wherein the reaction zone comprises components and reagents for carrying out a pH-influenced chemical and/or biological reaction; exposing the complexation agent in the pH-adjustment zone to an electrical potential, wherein the complexation agent associates and/or disassociates an acid and/or base to and/or from the solution upon exposure to the electrical potential and causes the pH of the solution to increase or decrease, thereby forming a pH-selected solution having a selected pH; and flowing the pH-selected solution to the reaction zone, wherein the chemical and/or biological reaction is influenced by the pH of the pH-selected solution, and wherein the chemical and/or biological reaction causes the pH of the pH-selected solution to decrease or increase.

In some embodiments, a method is provided comprising providing a system comprising a pH-adjustment zone and a reaction zone in fluid connection with the pH-adjustment zone, wherein the pH-adjustment comprises a complexation agent and wherein the reaction zone comprises components and reagents for carrying out a pH-influenced reaction involving the conversion of $CO_2$ to a dissolved species; exposing the complexation agent in the pH-adjustment zone to an electrical potential, wherein the complexation agent associates and/or disassociates an acid and/or base to and/or from the solution upon exposure to the electrical potential and causes the pH of the solution to increase or decrease, thereby forming a pH-selected solution having a selected pH; and flowing the pH-selected solution to the reaction zone, wherein the pH-influenced reaction involving the conversion of $CO_2$ to a dissolved species is influenced by the pH of the pH-selected solution, and wherein the reaction causes the pH of the pH-selected solution to decrease or increase.

Figure 1:
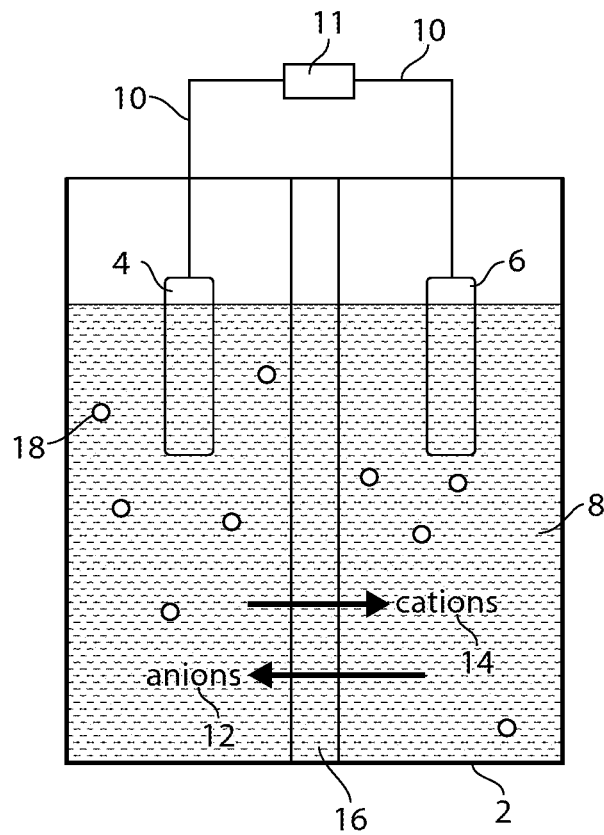
FIGS. 1-3 depict non-limiting systems of the present invention, according to some embodiments.

Other aspects, embodiments, and features of the invention will become apparent from the following detailed description when considered in conjunction with the accompanying drawings. The accompanying figures are schematic and are not intended to be drawn to scale. For purposes of clarity, not every component is labeled in every figure, nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

DETAILED DESCRIPTION

The present invention generally relates to methods and systems for carrying out a pH-influenced chemical and/or biological reaction. In some embodiments, the pH-influenced reaction involves the conversion of $CO_2$ to a dissolved species.

In some embodiments, the systems/methods described herein, through use of a chemically reversible Faradaic reaction of a complexation agent, modify the pH of a solution in contact with the complexation agent. In some cases, the complexation agent is capable of associating and/or disassociating an acid and/or a base to and/or from the solution upon exposure to an electrical potential, which in turns increases or decreases the pH of the solution. In some cases, the acid is a proton and/or the base is a hydroxide. Generally, the complexation agent is electrochemically active, that is, the complexation agent is stable in both an oxidized and reduced state. Additionally, the complexation agent may have dissimilar affinities for either acids (e.g., protons) or bases (e.g., hydroxides) when in different redox states.

In some cases, the complexation agent is capable of associating an acid from the solution upon exposure to an electrical potential, which in turns increases the pH of the solution. In some cases, the complexation agent is capable of dissociating an acid to the solution upon exposure to an electrical potential, which in turns decreases the pH of the solution. In some cases, the complexation agent is capable of associating a base from the solution upon exposure to an electrical potential, which in turns decreases the pH of the solution. In some cases, the complexation agent is capable of dissociating a base to the solution upon exposure to an electrical potential, which in turns increases the pH of the solution. In some cases, the acid is a proton. In some cases, the base is a hydroxide.

It should be understood, that while much of the discussion herein focuses on complexation agents which associate with an acid, the acid being a proton, this is by no means limiting, and those of ordinary skill in the art will be able to apply the teachings herein to systems/methods comprising a complexation agent which associates with a base, and/or with an acid being other than a proton.

In some embodiments, a system and/or a method of the present invention may operate as follow. In some cases, a solution is provided containing protons (or other acid) and is exposed to a complexation agent. An electrical potential can be applied to the complexation agent, which causes the complexation agent to associate with protons from the solution. The association of protons with the complexation agent causes the pH of the solution to increase (e.g., become more basic, as protons are being removed from the solution), wherein the electrical potential can be applied in such a manner that a desired number of protons are removed from the solution such that the pH of the solution reaches a selected pH and thus, a pH-selected solution is formed. The association may take place in a portion of the system termed a pH-adjustment zone. The pH-selected solution may then be used to influence the-influenced chemical and/or biological reaction. This may be accomplished by providing the pH-selected solution to a portion of the system termed a reaction zone (which may be the same or different than the pH-adjustment zone), wherein reagents and components are present for carrying out a pH-influenced chemical and/or biological reaction. In some embodiments, during the reaction, the chemical and/or biological reaction causes the pH of the pH-selected solution to decrease (e.g., due to release of the acid, thus causing the solution to become more acidic). To maintain the pH of the in the reaction zone and/or the pH of the pH-selected solution, additional solution from the pH-adjustment zone may be provide to the reaction zone. The systems and/or methods may be operated in batch mode, in a semi-continuous mode, and/or a continuous mode.

The term "pH-influenced chemical and/or biological reaction," as used herein, refers to a chemical and/or biological reaction which is influenced by the pH of the solution of which the chemical and/or biological reaction is the take place. By "influenced" is meant that at least one measureable parameter of the reaction is affected by the pH of the solution. Non-limiting parameters include the rate of the reaction, the selectivity of the reaction (e.g., percent of desired product versus side product(s); percent formation of desired stereoisomer, etc.), and/or the percent conversion of the reaction. As will be known to those of ordinary skill in the art, the pH of a solution for which a reaction is to take place can significantly affect the outcome of that reaction. For example, for many reactions, if the solution is not in a selected pH range, the reaction may not occur or may be substantially slowed. Non-limiting examples of pH-influenced chemical and/or biological reactions are described herein. Those of ordinary skill in the art will be aware of suitable methods for determining whether a reaction is influenced by the pH of the reaction environment, including, but not limiting, comparison of similar reactions carried out under substantially similar conditions, with the exception of the pH, and monitoring the formation of a product and/or the type of product over time (e.g., using one or more analytical techniques including, but not limited to, HPLC, IR, NMR, etc.). In some cases, the reaction is a chemical reaction. In some cases, the reaction is a biological reaction.

As used herein, a complexation agent refers to an agent (e.g., chemical entity) which is capable of associating and/or dissociating an acid and/or a base upon exposure to an electrical potential. In some embodiments, the complexation agent is capable of associating with an acid or base upon exposure to a first electrical potential and is capable of dissociating the acid or base upon exposure to a second electrical potential which is more negative than the first electrical potential. Alternatively, in some embodiments, the complexation agent is capable of associating with an acid or base upon exposure to a first electrical potential and is capable of dissociating the acid or base upon exposure to a second electrical potential which is more positive than the first electrical potential. In some embodiments, the complexation agent is capable of associating an acid upon exposure to a first electrical potential and is capable of dissociating the acid upon exposure to a second electrical potential which is more negative than the first electrical potential. In some embodiments, the complexation agent is capable of associating a base upon exposure to a first electrical potential and is capable of dissociating the base upon exposure to a second electrical potential which is more negative than the first electrical potential. In some embodiments, the complexation agent is capable of associating an acid upon exposure to a first electrical potential and is capable of dissociating the acid upon exposure to a second electrical potential which is more positive than the first electrical potential. In some embodiments, the complexation agent is capable of associating a base upon exposure to a first electrical potential and is capable of dissociating the base upon exposure to a second electrical potential which is more positive than the first electrical potential. Generally, the complexation agent exhibits such reversible behavior upon exposure to different potentials.

In some embodiments, the association or disassociation of an acid or a base contained in a solution with the complexation agent causes the pH of the solution to change. For example, association of an acid with a complexation agent and/or disassociation of a base from a complexation agent causes the pH of the solution to become more positive (e.g., more basic), due to removal of the acid from and/or addition of the base to the solution. Alternatively, disassociation of an acid from a complexation agent or association of a base with a complexation agent causes the pH of the solution to become more negative (e.g., more acidic) due to addition of the acid to and/or removal of the base from the solution.

Accordingly, through application of a sufficient electric potential to system, the acidity or basicity of the solution can be controlled, wherein the pH of the solution is changed due to the association and/or dissociation of an acid and/or base with the complexation agent. It should be understood, however, that the change in the pH of the solution is substantially caused by this process (e.g., association and/or dissociation of an acid and/or base), and is generally not caused by the production of product(s) of an electrochemical reaction. That is, the pH of the solution is not changed due to the production of a new chemical entity formed by electrolysis of a material (e.g., other than the complexation agent). For example, previously, the pH of a solution has been changed due to application of a potential which caused electrolysis of water, wherein the pH of the solution near an anode becomes acidic and pH of the solution near a cathode becomes basic (e.g., due to the local production of water electrolysis products). In some embodiments, the change in pH of the solution is not due to the presence of products formed by water electrolysis. A benefit of the use of system wherein the pH can be changed by association and/or dissociation of an acid and/or base with a complexation agent is that the pH of the solution can easily be returned to its original state, simply by application of a second potential.

A number of non-limiting examples of systems of the present disclosure will now be described in more detail. In some cases, a system comprises a pH-adjustment zone and a reaction zone. The pH-adjustment zone and the reaction zone may be in the same container/area or the two zones may be different containers/areas which are in fluid connection with each other (e.g., such that a solution may be flow from the pH-adjustment zone to the reaction zone and vice versa). In some embodiments, the pH-adjustment zone comprises a first container and contains the complexation agent and the reaction zone comprises a second container different from the first container and which contains the components and reagents for carrying out a pH-influenced chemical and/or biological reaction The complexation agent may be contained in the solution, may be a portion of the electrode, and/or may be associated with an electrode. In some embodiments, the pH-adjustment zone comprises a solution containing a complexation agent capable of associating and/or disassociating a proton and/or hydroxide to and/or from the solution upon exposure to an electrical potential. In other embodiments, the complexation agent is associated with an electrode and/or forms the electrode such that the solution contains substantially no complexation agent. In yet another embodiment, the complexation agent is in solution and upon application of an electrical potential to the solution using an electrode, the complexation agent forms a material associated with the electrode and/or a solid in the solution wherein the solid can be contained in the pH-adjustment zone (e.g., by settling, filtration) and the pH-selected solution which is provided to the reaction zone contains essentially no complexation agent. In some cases, however, the complexation agent is selected such that the phase (e.g., solid, liquid, in solution) does not change upon application of a voltage. Complexation agents are described in more detail herein. In some embodiments, wherein a system is to be used for the conversion of gas (e.g., $H_2S$, $SO_2$, $CO_2$) to a dissolved species, the reaction zone may comprise an absorption column. In embodiments wherein a system is to be used for the conversion of $CO_2$ to a dissolved species, the reaction zone may comprise a $CO_2$ absorption column.

In some embodiments, a system comprises a pH-adjustment zone and a reaction zone which may be the same or different than the pH-adjustment zone, provided the pH-adjustment zone and the reaction zone are in fluid communication with each other. The pH-adjustment zone may comprise a solution and an electrode exposed to the solution, wherein at least 30% of the electrode by weight comprises a complexation agent (e.g., capable of associating and/or disassociating an acid and/or a base to and/or from the solution upon exposure to an electrical potential). The term "fluid communication" as used herein refers to two components or regions containing a fluid, where the components or regions are connected together (e.g., by direct contact, or via a line, pipe, tubing, etc.) so that a fluid can flow between the two components or regions. Therefore, two chambers which are in "fluid communication" can, for example, be connected together by a line between the two chambers, such that a fluid can flow freely between the two chambers.

FIG. 1 shows a non-limiting example of a system of the invention. In FIG. 1, the system comprises container 2, first electrode 4 (e.g., anode) in electrical communication with second electrode 6 (e.g., cathode) via circuit 10, and solution 8 in contact with both first electrode 4 and second electrode 6. Circuit 10 may optionally comprise circuit component 11, e.g., power source, resistor, and/or capacitor. The system also comprises ion-permeable membrane 16 separating first electrode 4 from second electrode 6, and which allows for anions 12 to move from the first electrode side to the second electrode side and/or cations 14 to move from the second electrode side the first electrode side. Ion-migration balances the electroneutrality between the first electrode and the second electrode sides. Solution 8 contains complexation agent 18 (represented by circles). The pH of the solution can be changed by application of an electrical potential (e.g., between the first electrode and/or second electrode) which causes the pH of the solution to 1) decrease or 2) increase, depending on whether the application of the electrical potential causes the complexation agent to 1) associate a base and/or dissociate an acid, or 2) associate an acid and/or dissociate a base, respectively. The pH of the solution can be changed to a desired pH, which upon reaching it influences the pH-influenced chemical and/or biological reaction. This type of system is generally employed for use with pH-influenced reactions which are carried out in batches. That is, a set amount of reagents are provided to the system. If the pH of the solution reaches an undesired level during the reaction, additional electrical potential may be applied to cause the complexation agent to associate and/or dissociate more of the acid and/or base in the solution. The pH-influenced reaction is carried out until the reaction reaches a certain completion, followed by isolation of the product(s). Following completion of the reaction, if the pH-influenced reaction causes the pH of the solution to change, additional electrical potential may be applied to cause the complexation agent to associate and/or dissociate more of the acid and/or base in the solution such that a second batch of reagents can be provided to the solution and the pH-influenced reaction can be carried out. Advantageously, the system may also be regenerated between batches by application of a second electrical potential, wherein application of a second electrical potential causes the complexation agent to return to its original form. It should be understood that a variation of a batch system may comprise use of more than one type of complexation agent. In some embodiments, a system may comprise a first type of complexation agent and a second type of complexation agent. As a specific example, in some embodiments, a first type of complexation agent is present on the anode side and a second type of complexation agent is present on the cathode side, wherein upon application of a voltage to the system, each of the first type and the second type of complexation agents associates and/or dissociates an acid and/or base in a complementary way, such that the pH of the solution increases or decreases. It should also be understood that the system in FIG. 1 could readily be employed in embodiments where the complexation agent forms the electrode or a portion of the electrode (e.g., a solid complexation agent).

Figure 2:
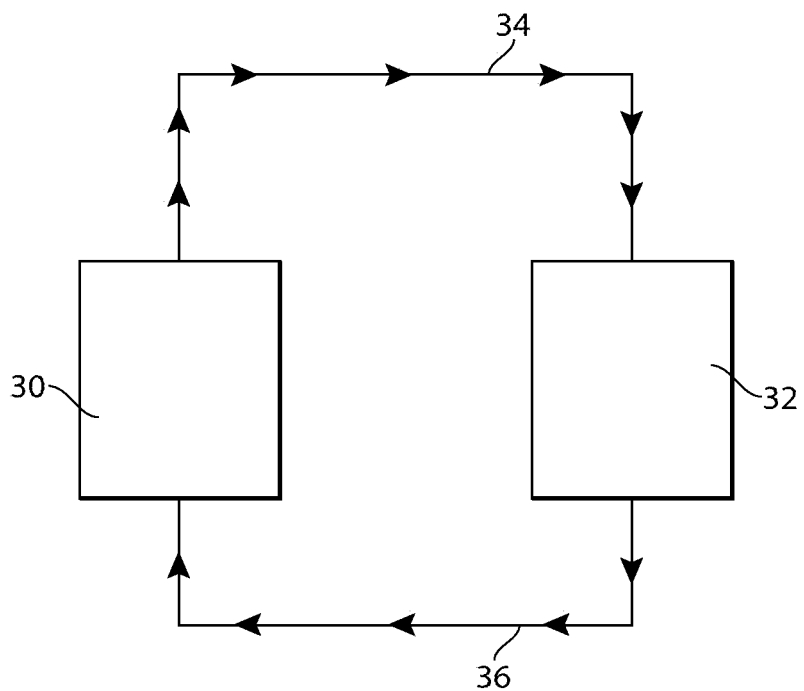

FIG. 2 illustrates another non-limiting example of a system of the invention. As opposed to the system in FIG. 1 which is generally employed for use with pH-influenced reactions which are carried out in batches, the system in FIG. 2 can be used to carry out semi-continuous and/or continuous reactions (e.g., wherein the reagents for the reaction are refreshed and/or the products of the reaction are removed while the system is in operation). The system in FIG. 2 comprises pH-adjustment zone 30 which comprises a first container and reaction zone 32 which comprises a second container. pH-adjustment zone 30 is in fluid communication with reaction zone 32 via fluid conduits 34 and 36. pH-adjustment zone 30 contains the complexation agent (e.g., having a form as described herein) and components (e.g., first electrode, second electrode, power source, etc.) for applying an electrical potential to the complexation agent. In this embodiment, the pH-adjustment zone contains the components to carry out both halves of an electrochemical reaction or comprises the components to carry out one half of an electrochemical reaction and is associated with another device which is capable of balancing the electrochemical reaction (e.g., a capacitor, a second half cell). Reaction zone 32 contains the component and reagents necessary for carrying out a pH-influenced reaction. A solution may be flowed between the pH-adjustment zone and the reaction zone. In the pH-adjustment zone, the pH of the solution in the pH-adjustment zone may be adjusted to a selected pH (e.g., thereby forming a pH-selected solution) by applying an electrical potential which causes the complexation agent to associate and/or dissociate an acid and/or base. In the reaction zone, the pH-influenced reaction may be influenced by introduction of the pH-selected solution to the zone (e.g., via fluid conduit 34). The reaction may cause the pH of solution in the reaction zone to decrease or increase. When the pH in the reaction zone is not at the desired level, additional solution from the pH-adjustment zone can be provided thereby changing the pH of the solution in the reaction zone. Optionally, at least a portion of the solution in the reaction zone may be returned to the pH-adjustment zone (e.g., via conduit 36).

Figure 3:
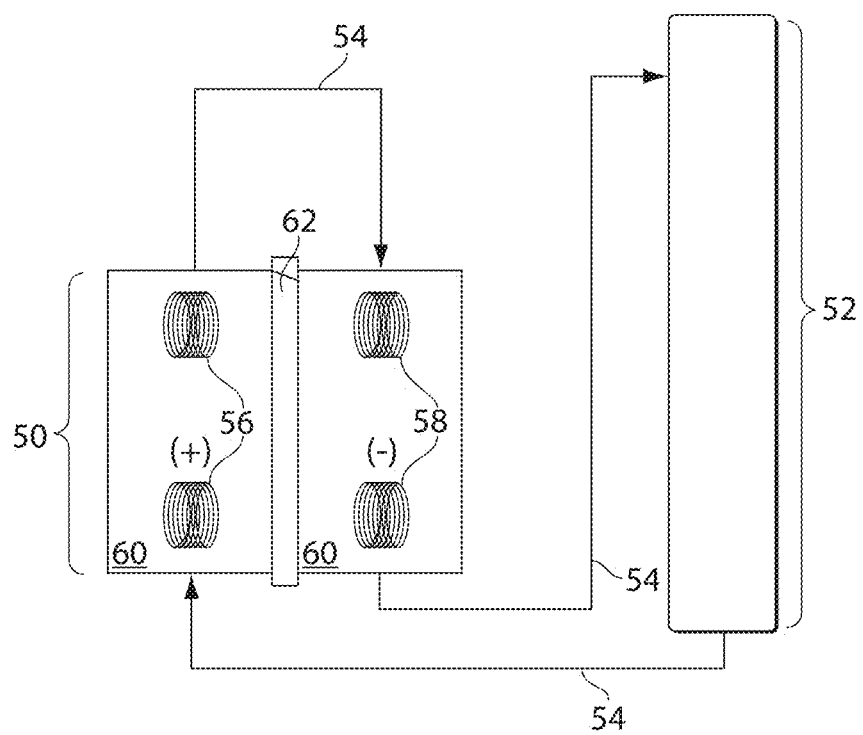

A specific example of a system as described in FIG. 2 is shown in FIG. 3. In FIG. 3, the system comprises pH-adjustment zone 50 and reaction zone 52 in fluid communication with the pH-adjustment zone by fluid conduits 54. pH-adjustment zone 50 comprises first electrode 56 (e.g., anode), second electrode 58 (e.g., cathode), solution 60, and membrane 62 (e.g., ion exchange membrane). In this figure, the complexation agent may be a portion of an electrode and/or may be contained in the solution. Upon application of a potential to the second electrode, the complexation agent dissociates an acid and/or base from the solution and thus the pH of the solution is changed to form a pH-selected solution. The pH-selected solution is flowed to reaction zone (e.g., via fluid conduits 54), wherein a pH-influenced reaction is carried out. In this example, the pH of the solution in the reaction zone is decreased or increased, and is flowed back into the pH-adjustment zone (e.g., via fluid conduit 54) wherein the pH of the solution can again be changed to a selected pH. See FIG. 6 described below for a more detailed description of a similar system for use in $CO_2$ conversion to a dissolved species.

In a non-limiting example of a complexation agent for use in FIG. 2, the second electrode may comprise $Cu(OH)_2$ (e.g., such that the reaction at the second electrode is $Cu(OH)_2 + 2e^- \rightarrow Cu + 2OH^-$) and the first electrode may comprise Cu (e.g., such that the reaction at the first electrode is $Cu + 2OH^- \rightarrow Cu(OH)_2 + 2e^-$). As another non-limiting example, the complexation agent may be quinone and the reactions may be:

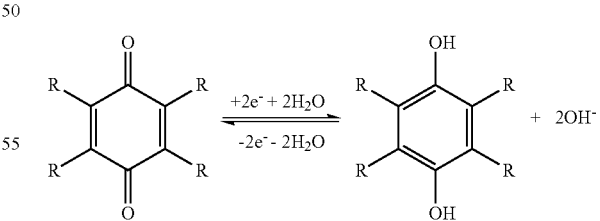

wherein each R can be the same or different and is a suitable substituent (e.g., hydrogen, alkyl, aryl, etc., each optionally substituted). In some embodiments, each R is the same or different and is hydrogen, optionally substituted alkyl, optionally substituted aryl, or optionally substituted heteroalkyl. In some embodiments, each R is the same or different and is H or optionally substituted alkyl. In some embodiments, each R is H.

Complexation agents will now be described in more detail. As noted above, the complexation agent may be provided in a solution (e.g., is soluble in the solution), may be a portion of the electrode, and/or may change phases depending on its environment (e.g., may be a solute at a first pH and a solid at a second pH). Generally, the complexation agent is a capable of associate and/or dissociating with an acid and/or a base upon application of an electrical potential to the complexation agent. In embodiments where a soluble complexation agent is employed, the agent may be reduced at the cathode and oxidized at the anode. As will be understood by those of ordinary skill in the art, if solutions are being added or removed, loss of the redox agent should be avoided, e.g., through appropriate separation techniques at any outlets. The agent is generally inactive or substantially inactive during the external pH dependent process. In some cases, a system/method may comprise more than one type of complexation agent (e.g., a first type of complexation agent and a second type of complexation agent different from the first type of complexation agent).

Those of ordinary skill in the art will be aware that each type of complexation agent will have a suitable pH range in which it is capable of affecting the pH of a solution to which it is exposed. For example, a first type of complexation agent may be capable of changing the pH of a solution between a pH of about 7 to a pH of about 3 and a second type of complexation agent may be capable of changing the pH of a solution between a pH of about 7 to a pH of about 10. In addition, each type of complexation agent may require a different range of electrical potentials to cause association and/or dissociation of an acid and/or base.

In some embodiments, the complexation agent may be used to change the pH of the solution from a pH of about 1, about 2, about 3, about 4, about 5, about 6, about 7, about 8, about 9, about 10, about 11, about 12, or about 13, by about 1 pH unit, about 2 pH units, about 3 pH units, about 4 pH units, about 5 pH units, about 6 pH units, about 7 pH units, about 8 pH units, about 9 pH units, about 10 pH units, about 11 pH units, or about 12 pH units. The pH of the pH-selected solution may be about 1, about 2, about 3, about 4, about 5, about 6, about 7, about 8, about 9, about 10, about 11, about 12, or about 13. In some embodiments, the pH of the pH-selected solution is between about 0 and about 14, or between about 1 and about 13, or between about 1 and about 6, or between about 1 and about 5, or between about 1 and about 4, or between about 1 and about 3, or between about 1 and about 2, or between about 0.1 and about 4, or between about 8 and about 13, or between about 9 and about 13, or between about 10 and about 13, or between about 11 and about 13, or between about 12 and about 13, or between about 10 and about 13.

In some cases, the association and/or dissociation of a pH requires an application of an electrical potential of about +/−0.1 volts, about +/−0.2 volts, about +/−0.3 volts, about +/−0.4 volts, about +/−0.5 volts, about +/−0.6 volts, about +/−0.7 volts, about +/−0.8 volts, about +/−0.9 volts, about +/−1 volts, about +/−1.1 volts, about +/−1.2 volts, about +/−1.3 volts, about +/−1.4 volts, about +/−1.5 volts, about +/−1.6 volts, about +/−1.7 volts about +/−1.8 volts, about +/−1.9 volts, about +/−2.0 volts, or about +/−2.5 volts. In some cases, the electrical potential is less than that required for the oxidation of water (e.g., −1.23 volts versus standard hydrogen electrode). In some embodiments, the application of the electrical potential is between about +/−0.1 and about +/−2.5 volts, or between about +/−0.1 and about +/−2 volts, or between about +/−0.1 and about +/−1.5 volts, or between about +/−0.1 and about +/−1 volts, or between about +/−0.5 and about +/−2.5 volts, or between about +/−0.5 and about +/−2 volts, or between about +/−1 and about +/−2.5 volts, or between about +/−1 and about +/−2 volts. Those of ordinary skill in the art will be aware of suitable methods and system for applying an electrical potential to a complexation agent (e.g., with use of a first electrode, a second electrode, and/or a power supply).

In some embodiments, the complexation agent is provided in a solution (e.g., to solution to be converted to a pH-selected solution). The concentration of the complexation agent in the solution may be about 0.1 M, about 0.2 M, about 0.3 M, about 0.4 M, about 0.5 M, about 0.6 M, about 0.7 M, about 0.8 M, about 0.9 M, about 1 M, about 1.2 M, about 1.4 M, about 1.5 M, about 1.75 M, about 2 M, about 2.5 M, about 3 M, about 4 M, about 5M, or greater. In some embodiments, the concentration of the complexation agent is between about 0.1 M and about 5 M, or between about 0.1 M and about 4 M, or between about 0.1 M and about 3 M, or between about 0.1 M and about 2 M, or between about 0.1 M and about 1 M, or between about 0.5 M and about 3 M, or between about 0.5 M and about 2 M.

In some embodiments, the complexation agent is provided as a solid. In some cases, the complexation agent may be formed on the surface of a substrate which is functioning as an electrode. In some cases, the electrode may comprise the complexation agent. In some cases, the electrode comprises the complexation agent, wherein at least about 10%, at least about 20%, at least about 30%, at least about 40%, at least about 50%, at least about 60%, at least about 70%, at least about 80%, at least about 90%, at least about 95%, at least about 98%, at least about 99%, or more, of the electrode by weight is the complexation agent.

The following equations describe non-limiting examples of complexation agents:

$$PbSO_4 + 2H_2O \Leftrightarrow PbO_2 + SO_4^{2-} + 4H^+ + 2e^- \quad E^0 = -1.685 \text{(vs. SHE)} \quad (1)$$

$$QH_2 \Leftrightarrow Q + 2H^+ + 2e^-, \text{ wherein } Q = \text{quinone } E^0 \approx 0.1 \text{(vs. SHE)} \quad (2)$$

$$QH_2 + 2OH^- \Leftrightarrow Q + 2H_2O + 2e^-, \text{ wherein } Q = \text{quinone} \quad (3)$$

$$Cu + 2OH^- \Leftrightarrow CuO + H_2O + 2e^- \quad (4)$$

$$Cu \Leftrightarrow Cu^{2+} + 2e^- \quad E^0 = -0.34 \text{(vs. SHE)} \quad (5)$$

$$Cu^{2+} + 2OH^- \Leftrightarrow Cu(OH)_2 \quad K_{sp} = 2.2 \times 10^{20} \quad (6)$$

$$Cu + 2OH^- \Leftrightarrow Cu(OH)_2 + 2e^- \quad E^0 = 0.27 \text{(vs. SHE)} \quad (7)$$

$$O_2 + H_2O + 4e^- \Leftrightarrow 4OH^- \quad E^0 = 0.4 \text{(SHE)} \quad (8)$$

$$2Cu + O_2 + H_2O \Leftrightarrow 2Cu(OH)_2 \quad E^0 = 0.67 \text{(SHE)} \quad (9)$$

$$2Fe + O_2 + H_2O \Leftrightarrow 2Fe(OH)_2 \quad E^0 = 1.34 \text{(SHE)} \quad (10)$$

Figure 4:
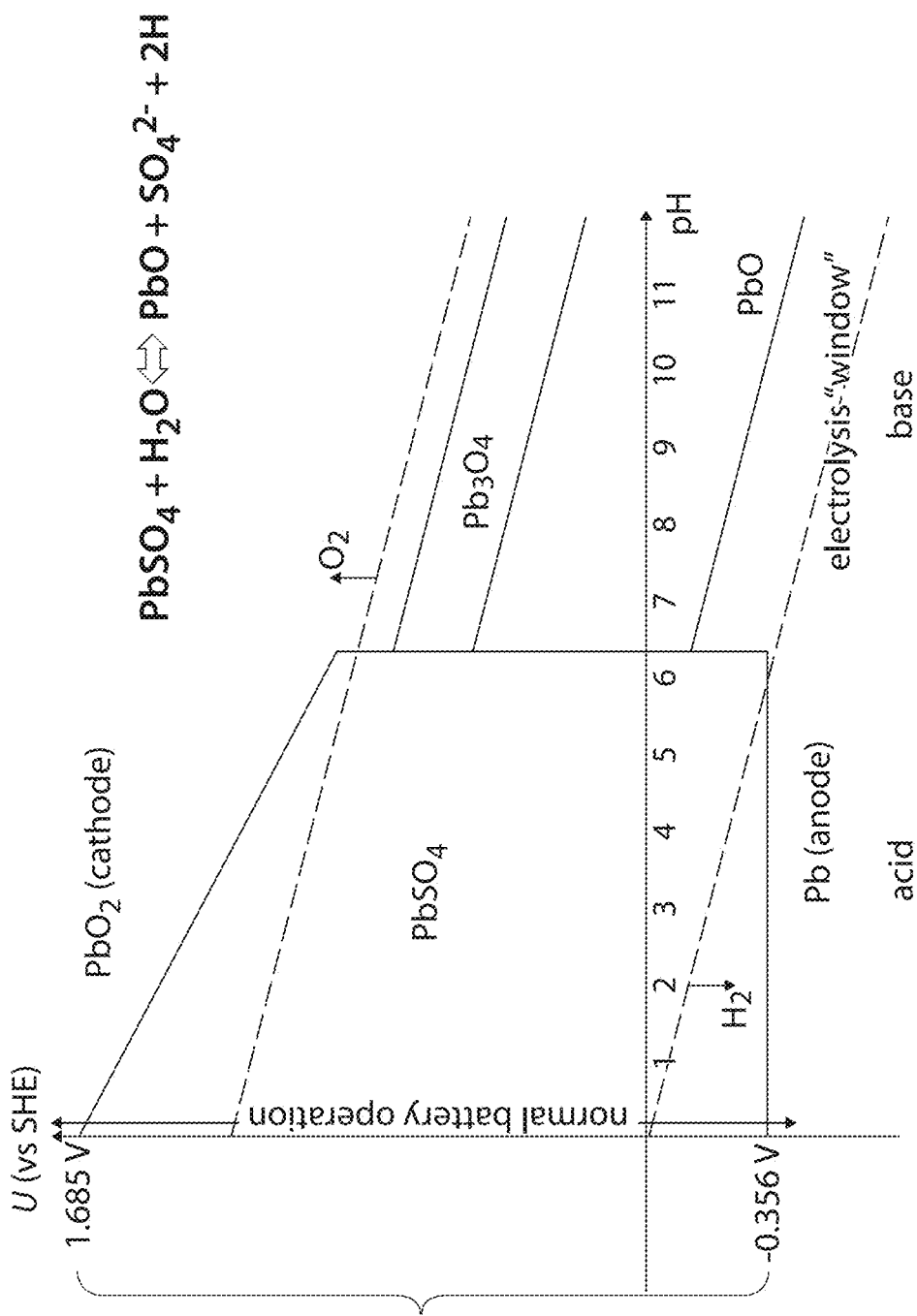
FIG. 4 shows a Pourbaix diagram for $PbSO_4$.
Figure 5:
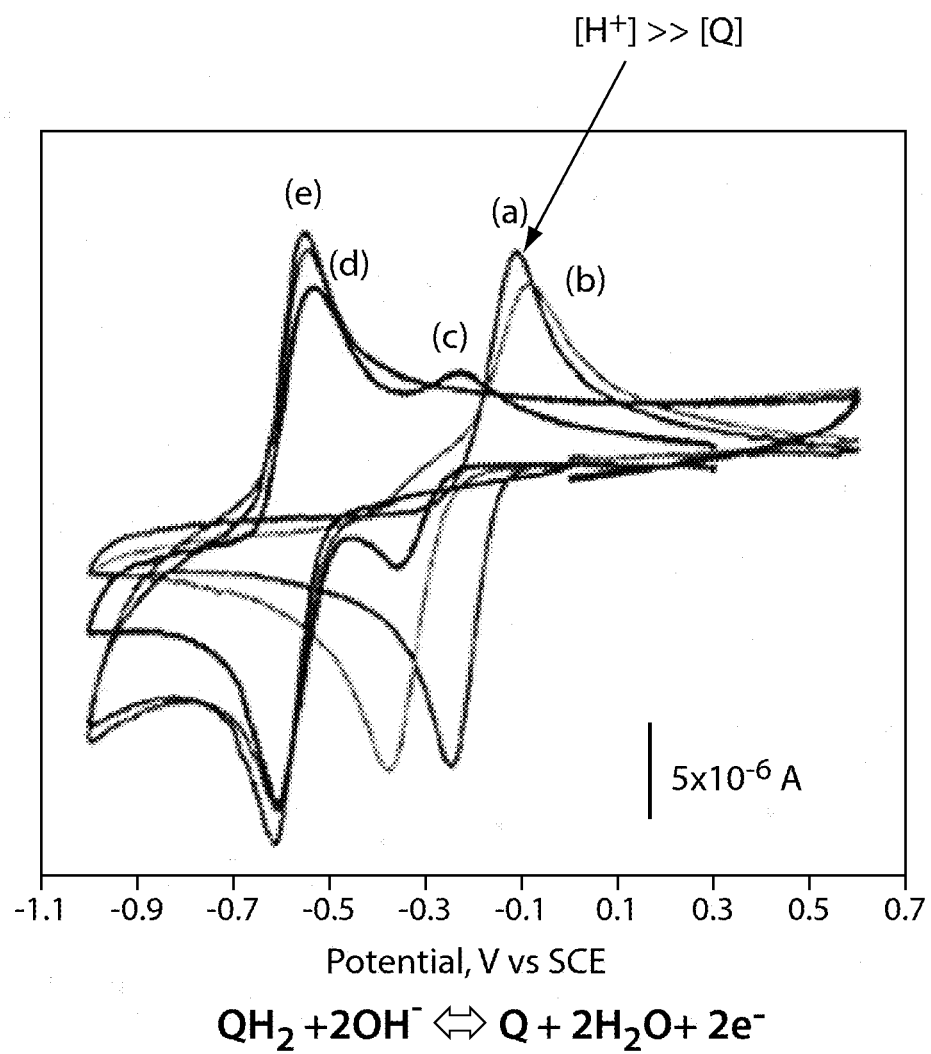
FIG. 5 shows cyclic voltammetry curves for an electrochemical reaction involving quinone.

The compounds in equation 1 may be useful to low pH ranges, the compounds in equations 2-3 may be useful for mid-pH ranges, and the compounds in equations 4-10 may be useful for high pH ranges. FIG. 4 shows a Pourbaix diagram (e.g., a potential/pH diagram) for the lead reaction shown in Equation 1. FIG. 5 shows cyclic voltammetry curves for the reaction in Equation 3. In some embodiments, the complexation agent is $PbSO_4$ and/or $PbO_2$; or $QH_2$ and Q, wherein Q is quinone, optionally substituted; or Cu and/or CuO; Cu and/or $Cu(OH)_2$; or $O_2$ and/or $OH^-$; or Fe and/or $Fe(OH)_2$.

In some embodiments, methods are provided. In one embodiment, a method comprises providing a system comprising a pH-adjustment zone and a reaction zone in fluid connection with the pH-adjustment zone, wherein the pH-adjustment comprises a complexation agent, and wherein the reaction zone comprises components and reagents for carrying out a pH-influenced chemical and/or biological reaction. The complexation agent in the pH-adjustment zone may be exposed to an electrical potential, wherein the complexation agent associates and/or disassociates an acid and/or a base to and/or from the solution upon exposure to the electrical potential and causes the pH of the solution to increase or decrease, thereby forming a pH-selected solution having a selected pH. This solution may be flowed to the reaction zone, wherein the chemical and/or biological reaction is influenced by the pH of the pH-selected solution, and wherein the chemical and/or biological reaction causes the pH of the pH-selected solution to decrease or increase. In another embodiment, a method comprises providing a system comprising a pH-adjustment zone and a reaction zone in fluid connection with the pH-adjustment zone, wherein the pH-adjustment comprises a complexation agent, and wherein the reaction zone comprises components and reagents for carrying out a pH-influenced reaction involving the conversion of $CO_2$ to a dissolved species. For example, the conversion of $CO_2$ may involve the capture, absorption, and/or dissolution of $CO_2$. In a particular embodiment, the conversion of $CO_2$ may involve capture of $CO_2$ with a base (e.g., an amine, ammonia) to form a dissolved species (e.g., a bicarbonate, a carbamate, etc.). The complexation agent in the pH-adjustment zone may be exposed to an electrical potential, wherein the complexation agent associates and/or disassociates an acid and/or a base to and/or from the solution upon exposure to the electrical potential and causes the pH of the solution to increase or decrease, thereby forming a pH-selected solution having a selected pH. This solution may be flowed to the reaction zone, wherein the pH-influenced reaction involving the conversion of $CO_2$ (e.g., to a dissolved species) is influenced by the pH of the pH-selected solution, and wherein the reaction causes the pH of the pH-selected solution to decrease or increase.

The systems and methods of the present invention may find application for carrying out a variety of pH-influenced reactions. For example, many biological reactions involving enzymes are pH sensitive. Applications of the systems/methods include, but are not limited to, acid or base catalysis, acid or basic gas scrubbing, regeneration of hydroxides from carbonates (e.g., currently done in paper pulp processing), and other pH dependent separations such as crystallization, actuation of pH responsive polymers, and sterilization.

In some embodiments, the systems and/or methods may be used in applications involving acid or base catalysts. For example, transesterification reactions and Aldol reactions in industry that require acidic or basic conditions in order to catalyze hydration or dehydration reactions.

In some embodiments, the systems and/or methods may be used in applications involving acid or basic gas scrubbing. Gas scrubbing is commonly employed to prevent the release of toxic chemicals (e.g., ammonia or hydrochloric acid) as well as greenhouse gases (e.g., carbon dioxide or sulfur dioxide) which are produced as byproduct in a variety of reactions. Acids and bases can be used as effective sorbents for these cases, for example, if the acid or base is a Lewis acid or a Lewis base, respectively.

In some embodiments, the systems and/or methods may be used in applications, wherein the pH-influenced reaction involves the conversion of $CO_2$ (e.g., to a dissolved species). Such systems provide many advantages over current methods, including lower costs, increased efficiency (e.g., due to the need for less heating), the ability to operate under higher pressures (if desired), and/or fewer side products. In addition, the system may be capable of being regenerated.

In some embodiments, a system/method for the capture of $CO_2$ from gaseous streams containing a mixture of gases is provided wherein at least a portion of the system/method comprises the conversion of $CO_2$ (e.g., to a dissolved species). Such system may comprise the use of an amine solution (e.g., a basic solution). When the amine is present in solution, the $CO_2$ and the amine can associate to form an amine-$CO_2$ complex (e.g., a carbamate) and thus the $CO_2$ has been converted to a dissolved species. Disassociation of the amine from the amine-$CO_2$ complex causes the $CO_2$ gas to reform. The amine may be provided to or removed from the solution by disassociating or associating with a complexation agent, respectively, which causes the pH of the solution to increase or decrease, respectively.

As a specific example of such a system, the process may comprise the complexation agents comprising copper. As will be known to those of ordinary skill in the art, Cu(II) is capable of coordinating with ligands containing amine and/or carboxylic acid groups. When removing Cu(II) from the solution, either Cu(I) species or Cu(0) could be formed to reduce the competition for $CO_2$.

A non-limiting set of reactions which may occur in a system for $CO_2$ conversion is provided below in Equations 11-14. In these equations, a primary amine (e.g., $RNH_2$, wherein R is alkyl, aryl, etc., optionally substituted) is reversibly provided to and/or removed from a solution via disassociation or association with a complexation agent comprising copper, respectively, thereby changing the pH of the solution. It should be noted that the copper/amine complexes may also be associated with hydroxide anions, which are not shown here for clarity.

Absorption: $2RNH_2 + CO_2 \rightarrow RNHCOO^- + RNH_3^+$ (11)

Activation: $Cu \rightarrow Cu^{2+} + 2e^-$ (12)

Desorption: $Cu^{+2} + RNH_3^+ + RNHCOO^- \rightarrow$
$[Cu.(RNH_2)_2]^{+2} + CO_2$ (13)

Regeneration: $[Cu.(RNH_2)_2]^{+2} + 2e^- \rightarrow Cu + 2RNH_2$ (14)

Figure 6:
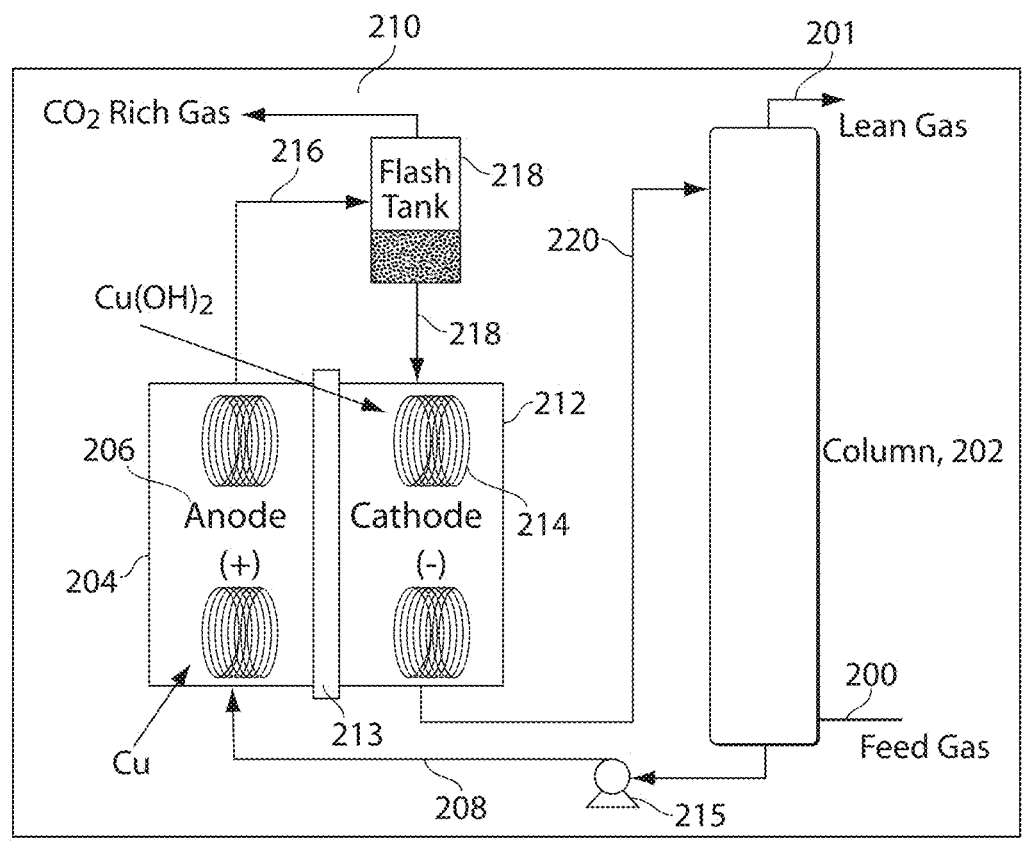
FIG. 6 depicts a non-limiting system of the present invention for use in the conversion of $CO_2$ to a dissolved species, according to some embodiments.

The system can operate as follows and as illustrated in FIG. 6. A feed gas comprising $CO_2$ and other gaseous materials (e.g., $N_2$) is provided by inlet 200 and is flowed through column 202 which comprises a primary amine and out through outlet 201. During the flow through the column comprising $RNH_2$, absorption occurs as per Equation 11, thereby forming $RNHCOO^-$. The resulting $RNHCOO^-$ (e.g., in solution) species is provided to anode container 204 containing anode 206. For example, $RNHCOO^-$ may be in a solution and may be flowed to anode container 204 via fluid connectors 208. The system may optionally comprise a pump (e.g., 215) which can be used to circulate the solution throughout the system. In this example, anode 206 comprises Cu(0). Upon application of an electrical potential to anode 206, Cu(II) ions may form (e.g., as per equation 12). The Cu(II) ions may react with the $RNHCOO^-$ present in solution (e.g., via Equation 13), thereby causing $CO_2$ to be released and $[Cu.(RNH_2)_2]^{+2}$ to form. This solution can be provided, optionally via flash tank 218 (e.g., to allow release and collection of $CO_2$ gas) to cathode container 212 comprising cathode 214. For example, a solution containing $[Cu.(RNH_2)_2]^{+2}$ of Equation 13 may be flown via fluid conduit 216 to flash tank 208 wherein the $CO_2$ rich gas may be collected (e.g., via outlet 210), followed by flowing the solution via fluid conduit 218 to cathode container 212. Cathode container 214 and anode container 204 may be optionally separated by membrane 213. In cathode container 212, application of an electric potential can cause [Cu(RNH$_2$)$_2$]$^{+2}$ to dissociate, thereby reforming Cu(0) and regenerating the primary amine (e.g., via Equation 14). Accordingly, FIG. 6 illustrates a regenerable system for the collection of CO$_2$ gas. See also Example 1.

Those of ordinary skill in the art will be able to select other materials and reaction to which the above described systems/methods may be used. For example, while this example described use of an oxidized species in solution and a reduced species as a solid, those of ordinary skill in the art will be able to employ materials in which both the oxidized and reduces species are in solution. For example, the system may employ solutions comprising amines, the use of suspended copper and copper oxide particles with glassy carbon electrodes instead of Cu/CuO electrodes, and/or other complexation agents.

Generally, the systems/methods comprise at least one solution in which the pH-influenced chemical and/or biological reaction occurs. In some embodiments, the solution functions as an electrolyte. An electrolyte, as known to those of ordinary skill in the art, is any substance containing free ions that is capable of functioning as an ionically conductive medium. In some cases, the electrolyte is a liquid. In many embodiments, the solution comprises water. In some cases, the solution comprises mixtures of solvents, such as water, organic solvents, amines, and the like. In some cases, the starting pH of the solution is about neutral (e.g., prior to changing the pH by application of an electrical potential to the complexation agent). That is, the pH of the electrolyte may be between about 5.5 and about 8.5, between about 6.0 and about 8.0, about 6.5 about 7.5, and/or the pH is about 7.0. In a particular case, the pH is about 7.0. In other cases, the pH of the electrolyte is about neutral or acidic. In these cases, the pH may range from about 0 to about 8, about 1 to about 8, about 2 to about 8, about 3 to about 8, about 4 to about 8, about 5 to about 8, about 0 to about 7.5, about 1 to about 7.5, about 2 to about 7.5, about 3 to about 7.5, about 4 to about 7.5, about 5 to about 7.5. In yet other cases, the pH may be between about 6 and about 10, about 6 and about 11, about 7 and about 14, about 2 and about 12, and the like. In a specific embodiment, the pH is between about 6 and about 8, between about 5.5 and about 8.5, between about 5.5 and about 9.5, between about 5 and about 9, between about 3 and about 11, between about 4 and about 10, or any other combination thereof.

Various components of a system, such as the electrode, power source, electrolyte, separator, container, circuitry, insulating material, gate electrode, etc. can be fabricated by those of ordinary skill in the art from any of a variety of components, as well as those described in any of those patent applications described herein. Components may be molded, machined, extruded, pressed, isopressed, infiltrated, coated, in green or fired states, or formed by any other suitable technique. Those of ordinary skill in the art are readily aware of techniques for forming components of system herein.

In some embodiments, a system comprises at least one electrode, or at least two electrode, or two electrodes. In some cases, an electrode comprises a complexation agent, as described herein. In embodiments, wherein the electrode is not formed of the complexation agent, an electrode may comprise any material that is substantially electrically conductive. The electrode may be transparent, semi-transparent, semi-opaque, and/or opaque. The electrode may be a solid, semi-porous or porous. Non-limiting examples of electrodes include indium tin oxide (ITO), fluorine tin oxide (FTO), glassy carbon, metals, lithium-containing compounds, metal oxides (e.g., platinum oxide, nickel oxide), graphite, nickel mesh, carbon mesh, and the like. Non-limiting examples of suitable metals include gold, copper, silver, platinum, nickel, cadmium, tin, and the like. In some instances, the electrode may comprise nickel (e.g., nickel foam or nickel mesh). The electrodes may also be any other metals and/or non-metals known to those of ordinary skill in the art as conductive (e.g., ceramics). The electrode may be of any size or shape. Non-limiting examples of shapes include sheets, cubes, cylinders, hollow tubes, spheres, and the like. The electrode may be of any size. Additionally, the electrode may comprise a means to connect the electrode to another electrode, a power source, and/or another electrical device.

Various electrical components of system may be in electrical communication with at least one other electrical component by a means for connecting. A means for connecting may be any material that allows the flow of electricity to occur between a first component and a second component. A non-limiting example of a means for connecting two electrical components is a wire comprising a conductive material (e.g., copper, silver, etc.). In some cases, the system may also comprise electrical connectors between two or more components (e.g., a wire and an electrode). In some cases, a wire, electrical connector, or other means for connecting may be selected such that the resistance of the material is low. In some cases, the resistances may be substantially less than the resistance of the electrodes, electrolyte, and/or other components of the system.

In some embodiments, a power source may supply DC voltage to a system. Non-limiting examples include batteries, power grids, regenerative power supplies (e.g., wind power generators, photovoltaic cells, tidal energy generators), generators, and the like. The power source may comprise one or more such power supplies (e.g., batteries and a photovoltaic cell). In a particular embodiment, the power supply is a photovoltaic cell.

In some embodiments, a system may comprise a separating membrane. A separating membrane may be made of suitable material, for example, a plastic film. Non-limiting examples of plastic films included include polyamide, polyolefin resins, polyester resins, polyurethane resin, or acrylic resin and containing lithium carbonate, or potassium hydroxide, or sodium-potassium peroxide dispersed therein. In some cases, the membrane may be an anion exchange membrane and/or cation exchange membrane (i.e., ones with anion and/or cation exchangeable ions) which are readily available from commercial sources. Non-limiting examples of anionic exchange membranes include poly(ethylene-co-tetrafluoroethylene), poly(hexafluoropropylene-co-tetrafluoroethylene), poly(epichlorhydrin-ally glycidyl ether), poly(ether imide), poly(ethersulfone) cardo, poly(2,6-dimethyl-1,4-phenylene oxide), polysulfone, or polyethersulfone, associated with a plurality of cationic species (e.g., quaternary ammonium groups, phosphonium groups, etc.).

A container may be any receptacle, such as a carton, can, or jar, in which components of a system may be held or carried. A container may be fabricated using any known techniques or materials, as will be known to those of ordinary skill in the art. For example, in some instances, the container may be fabricated from gas, polymer, metal, and the like. The container may have any shape or size, providing it can contain the components of the system. Components of the system may be mounted in the container. That is, a component (e.g., an electrode) may be associated with the container such that it is immobilized with respect to the container, and in some cases, is supported by the container. A component may be mounted to the container using any common method and/or material known to those skilled in the art (e.g., screws, wires, adhesive, etc.). The component may or might not physically contact the container. In some cases, an electrode may be mounted in the container such that the electrode is not in contact with the container, but is mounted in the container such that it is suspended in the container.

Reagents may be supplied to and/or removed from a system using a commonly known transport device. The nature of the reagent delivery may vary with the type of fuel and/or the type of device. For example, solid, liquid, and gaseous reagents may all be introduced in different manners. The reagent transport device may be a gas or liquid conduit such as a pipe or hose which delivers or removes fuel, such as hydrogen gas or methane, from the system and/or from the reagent storage device. Alternatively, the system may comprise a movable gas or liquid storage container, such as a gas or liquid tank, which may optionally be physically removed from the system after the container is filled with reagent.

As used herein, the term "alkyl" is given its ordinary meaning in the art and may include saturated aliphatic groups, including straight-chain alkyl groups, branched-chain alkyl groups, cycloalkyl (alicyclic) groups, alkyl substituted cycloalkyl groups, and cycloalkyl substituted alkyl groups. In certain embodiments, a straight chain or branched chain alkyl has about 30 or fewer carbon atoms in its backbone (e.g., $C_1$-$C_{30}$ for straight chain, $C_3$-$C_{30}$ for branched chain), and alternatively, about 20 or fewer. Likewise, cycloalkyls have from about 3 to about 10 carbon atoms in their ring structure, and alternatively about 5, 6 or 7 carbons in the ring structure.

The term "heteroalkyl" is given its ordinary meaning in the art and refers to alkyl groups as described herein in which one or more atoms is a heteroatom (e.g., oxygen, nitrogen, sulfur, and the like).

The term "aryl" is given its ordinary meaning in the art and refers to single-ring aromatic groups such as, for example, 5-, 6- and 7-membered single-ring aromatic groups. The term "heteroaryl" is given its ordinary meaning in the art and refers to aryl groups as described herein in which one or more atoms is a heteroatom (e.g., oxygen, nitrogen, sulfur, and the like). Examples of aryl and heteroaryl groups include, but are not limited to, phenyl, pyrrolyl, furanyl, thiophenyl, imidazolyl, oxazolyl, thiazolyl, triazolyl, pyrazolyl, pyridinyl, pyrazinyl, pyridazinyl and pyrimidinyl, and the like. It should be understood that, when aryl and heteroaryl groups are used as ligands coordinating a metal center, the aryl and heteroaryl groups may have sufficient ionic character to coordinate the metal center. For example, when a heteroaryl group such as pyrrole is used as a nitrogen-containing ligand, as described herein, it should be understood that the pyrrole group has sufficient ionic character (e.g., is sufficiently deprotonated to define a pyrrolyl) to coordinate the metal center. In some cases, the aryl or heteroaryl group may comprise at least on functional group that has sufficient ionic character to coordinate the metal center, such as a biphenolate group, for example.

As used herein, the term "substituted" is contemplated to include all permissible substituents of organic compounds, "permissible" being in the context of the chemical rules of valence known to those of ordinary skill in the art. In some cases, "substituted" may generally refer to replacement of a hydrogen with a substituent as described herein. However, "substituted," as used herein, does not encompass replacement and/or alteration of a key functional group by which a molecule is identified, e.g., such that the "substituted" functional group becomes, through substitution, a different functional group. For example, a "substituted phenyl" group must still comprise the phenyl moiety and cannot be modified by substitution, in this definition, to become, e.g., a cyclohexyl group. In a broad aspect, the permissible substituents include acyclic and cyclic, branched and unbranched, carbocyclic and heterocyclic, aromatic and nonaromatic substituents of organic compounds. Illustrative substituents include, for example, those described herein. The permissible substituents can be one or more and the same or different for appropriate organic compounds. For purposes of this invention, the heteroatoms such as nitrogen may have hydrogen substituents and/or any permissible substituents of organic compounds described herein which satisfy the valencies of the heteroatoms. This invention is not intended to be limited in any manner by the permissible substituents of organic compounds.

Examples of substituents include, but are not limited to, lower alkyl, lower aryl, lower aralkyl, lower cyclic alkyl, lower heterocycloalkyl, hydroxy, lower alkoxy, lower aryloxy, perhaloalkoxy, aralkoxy, lower heteroaryl, lower heteroaryloxy, lower heteroarylalkyl, lower heteroaralkoxy, azido, amino, halogen, lower alkylthio, oxo, lower acylalkyl, lower carboxy esters, carboxyl, -carboxamido, nitro, lower acyloxy, lower aminoalkyl, lower alkylaminoaryl, lower alkylaryl, lower alkylaminoalkyl, lower alkoxyaryl, lower arylamino, lower aralkylamino, lower alkylsulfonyl, lower-carboxamidoalkylaryl, lower-carboxamidoaryl, lower hydroxyalkyl, lower haloalkyl, lower alkylaminoalkylcarboxy-, lower aminocarboxamidoalkyl-, cyano, lower alkoxyalkyl, lower perhaloalkyl, lower arylalkyloxyalkyl, and the like.

U.S. Provisional Patent Application Ser. No. 61/528,449, filed Aug. 29, 2011, by Stern et al., is herein incorporated by reference.

The following examples are intended to illustrate certain embodiments of the present invention, but do not exemplify the full scope of the invention.

Example 1

This example describes a non-limiting system and/or method for affecting the pH of a solution. The system employed in depicted in FIG. 6 and described in the specification. For this experiment, a two-compartment flow cell with each compartment having approximately 20 mL of volume. One compartment contained a copper (Cu) electrode while the other contained a partially oxidized copper electrode. Partial oxidation was achieved via soaking the copper in a concentrated potassium hydroxide solution for several days. A black layer of copper oxide (CuO) was observed on the surface of the oxidized electrode. The two chambers were separated by a Nafion 117 membrane previously soaked in a potassium nitrate solution with a 20 $cm^2$ working area. The chamber was flushed with copious amount of deionized water then 0.1 molar potassium nitrate.

Figure 7:
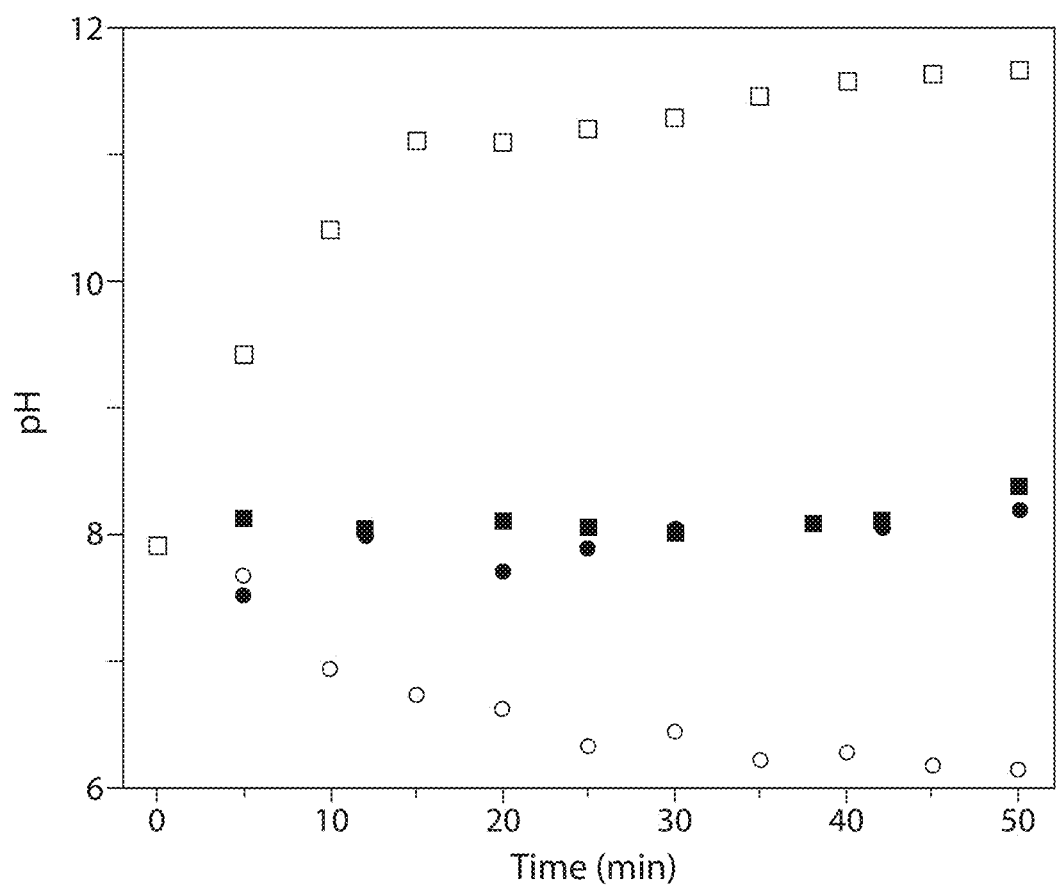
FIG. 7 plots pH measurements of an outlet stream as a function of time for a non-limiting system wherein no electrical potential was provided (solid markers) and wherein a 10 mA electrical potential was provided (open markers), wherein the complexation agent comprises copper, according to a non-limiting embodiment.

A 0.1 molar potassium nitrate solution was injected into both sides of the flow cell simultaneously at 1 mL/min in each side for 50 minutes. A 10 mA current (0.5 $mA/cm^2$ current density) was applied via a potentiostat to the system. Voltages increased to approximately 0.7 to 0.8 volts during the course of the experiment. Each outlet stream was fractionated into 5 mL samples and the pH of each fraction was measured and recorded. A plot of pH versus time based on the 5 mL fractionation of the two outputs can be seen in FIG. 7. Open squares represent the outlets from the CuO side (cathode) and open circles represent the outlet from the Cu side (anode). Filled squares and circles represent results from a control experiment done in a substantially similar manner except with no current applied between the anode and cathode.

Anode: $Cu+H_2O \rightarrow CuO+2e^-$

Cathode: $CuO+2H^++2e^- \rightarrow Cu+H_2O$

Figure 8:
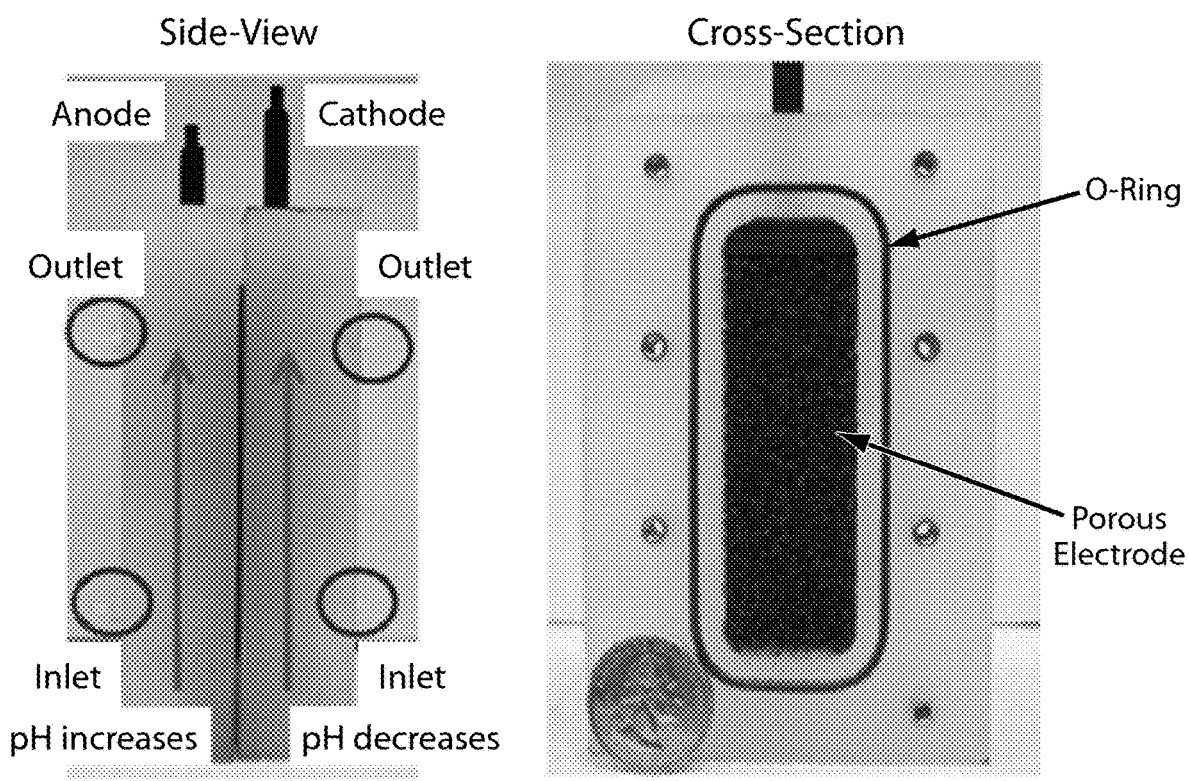
FIG. 8 shows photographs of a non-limiting system.

FIG. 8 shows photographs of the system used for this example. This system may find application for use the conversion of $CO_2$ (e.g., for capturing $CO_2$ from a gaseous stream containing a mixture of gases). In FIG. 8, syringe pumps are used to flow solution through both sides simultaneously in a co-current fashion. The outlet pH is measured over time (fractioned output). The o-rings are placed on both sides and allow for placement of a membrane between electrodes. The porous electrode could be coated with a heterogenous redox agent.

Example 2

This example describes a non-limiting system and/or method for affecting the pH of a solution. For this experiment, a two-compartment flow cell with each compartment having approximately 20 mL of volume, each containing vitreous carbon foam electrodes, and being separated by a Nafion 117 membrane previously soaked in a concentrated sodium chloride solution was used. The chamber was flushed with copious amount of deionized water then 1 molar sodium chloride before being filled with the working solution. The working solution was contained 1 molar sodium chloride, 0.01 molar benzoquinone (BQ), and 0.01 molar hydroquinone ($BQH_2$).

The working solution was injected into both sides of the flow cell simultaneously at 1 mL/min in each side for 40 minutes. A 10 mA current (0.5 mA/cm² current density) was applied via a potentiostat to the system. Voltages increased to approximately 0.3 to 0.5 volts during the course of the experiment. Each outlet stream was fractionated into 5 mL samples and the pH of each fraction was measured and recorded. A plot of pH versus time based on the 5 mL fractionation of the two outputs can be seen in FIG. 9a. FIG. 9b shows the voltage as a function of time during the experiment. The pH did not increase significantly in the cathode because of the rapid base-catalyzed degradation of the quinone species at high pH values. Evidence of such degradation could be seen by a distinct darkening of the cathode outlet and noticeable precipitate.

Anode: $BQH_2 \rightarrow BQ+2H^++2e^-$

Cathode: $BQ+2H^++2e^- \rightarrow BQH_2$

Figure 9A:
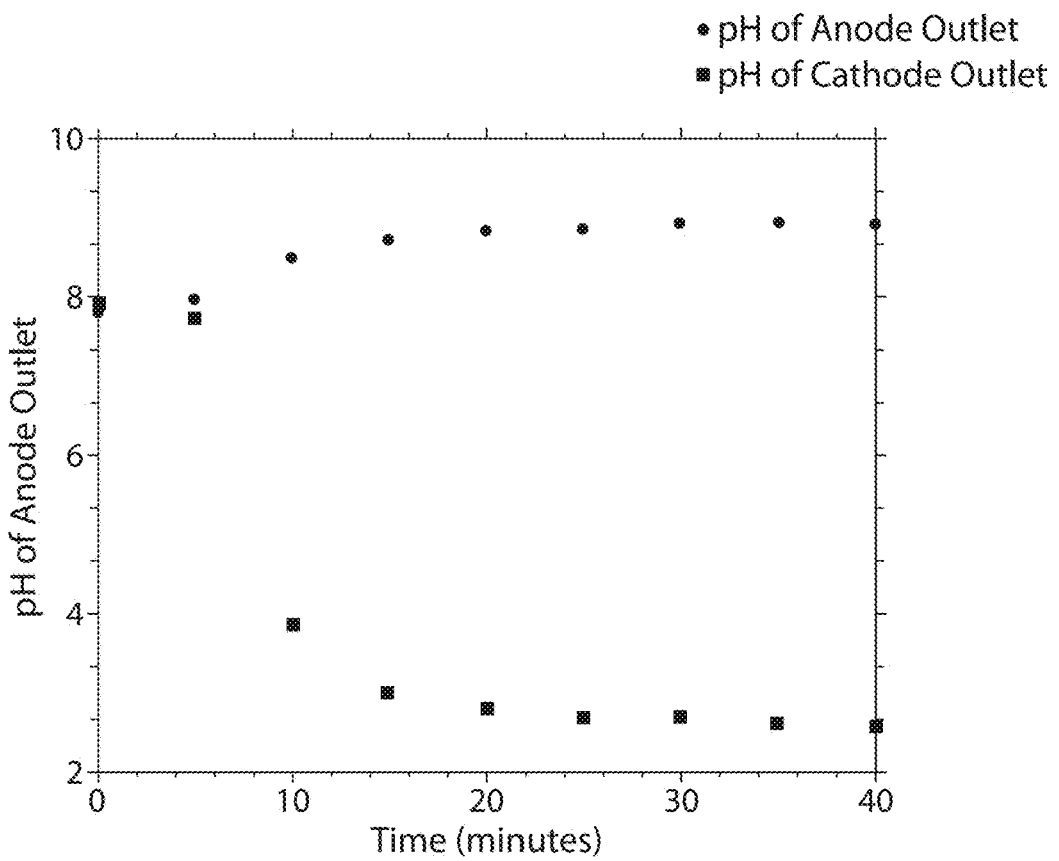
FIG. 9a shows a plot of outlet pH values of a system, wherein benzoquinone is converted into hydroquinone at the anode and hydroquinone is converted to benzoquinone at the cathode, according to a non-limiting embodiment.
Figure 9B:
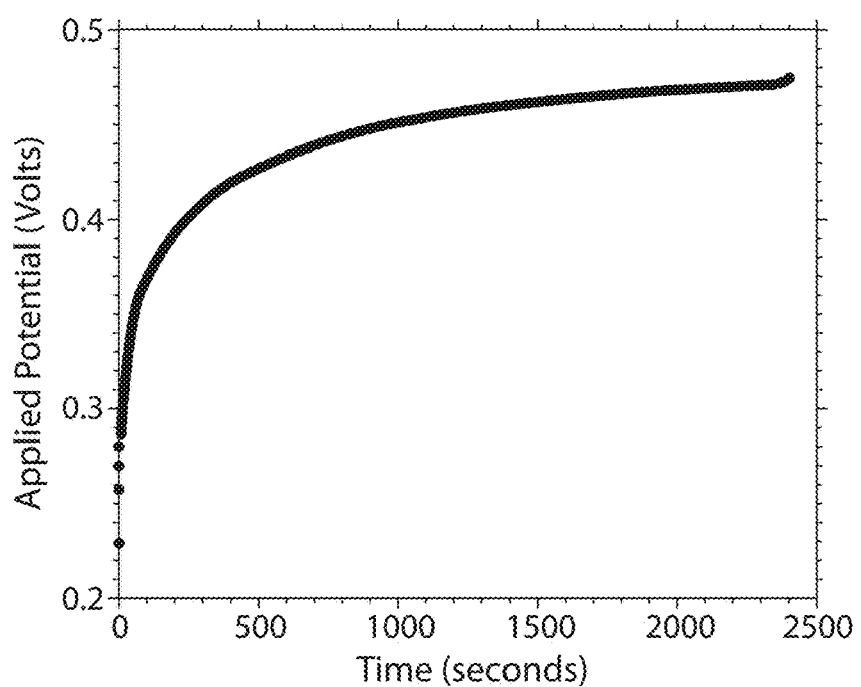
FIG. 9b shows a plot of the required potential to maintain a 10 mA current over the course of the experiment shown in FIG. 9a, according to a non-limiting embodiment.

In FIG. 9a: Plot of outlet pH values, where benzoquinone is converted into hydroquinone at the anode and hydroquinone is converted to benzoquinone at the cathode. In FIG. 9b: Plot of the required potential to maintain a 10 mA current over the course of the experiment. The increase in potential results from the increase in the difference of pH values between the two cells (e.g., as predicted by the Nernst Equation).

Example 3

For this experiment, a two-compartment flow cell with each compartment having approximately 20 mL of volume, each containing lead (Pb) electrodes, which had been partially oxidized. Oxidation was achieved via a potentiostat that applied a 2.5 volt potential difference between the lead electrode and piece of platinum foil for several hours. A dark brown layer of lead dioxide ($PbO_2$) was observed on the outside of the electrodes. The two chambers were separated by a Nafion 117 membrane previously soaked in a concentrated sodium chloride solution with a 20 cm² working area. The chamber was flushed with copious amount of deionized water then 0.3 molar sodium sulfate to remove any remaining chloride ions.

Figure 10:
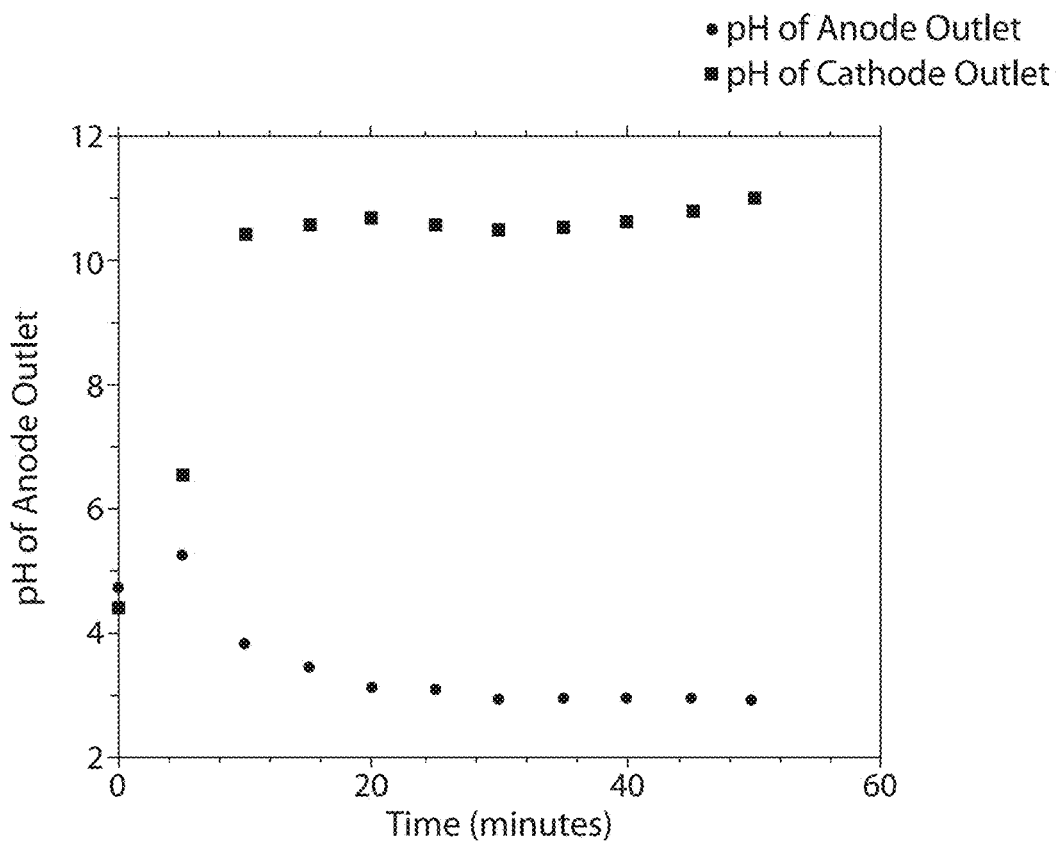
FIG. 10 shows a plot of outlet pH of a system, wherein lead is converted into lead dioxide at the anode and lead dioxide is converted to a mixture of lead and lead sulfate at the cathode, according to a non-limiting embodiment.
Figure 11:
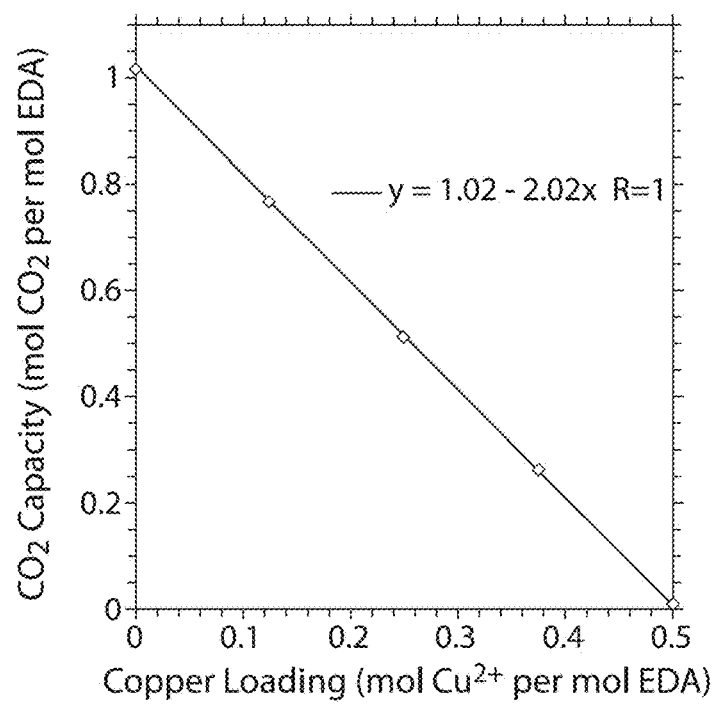
FIG. 11 shows a plot of $CO_2$ capacity per copper loading, according to a non-limiting embodiment.

A 0.3 molar sodium sulfate solution was injected into both sides of the flow cell simultaneously at 1 mL/min in each side for 50 minutes. A 10 mA current (0.5 mA/cm² current density) was applied via a potentiostat to the system. Voltages increased to approximately 2 volts to 3 volts during the course of the experiment. After the experiment, the anode showed significant quantities of lead dioxide and the cathode showed the presence of lead sulfate ($PbSO_4$), which indicates that the lead transformation, and not water hydrolysis, was the dominant electrochemical process during the experiment. Each outlet stream was fractionated into 5 mL samples and the pH of each fraction was measured and recorded. A plot of pH versus time based on the 5 mL fractionation of the two outputs can be seen in FIG. 10.

Anode: $Pb+2H_2O \rightarrow PbO_2+4H^++4e^-$

Cathode: $PbO_2+4H^++4e^- \rightarrow Pb+2H_2O$ and $PbO_2+4H^++SO_4^{2-}+2e^- \rightarrow PbSO_4+H_2O$ In FIG. 10: Plot of outlet pH wherein lead is converted into lead dioxide at the anode and lead dioxide is converted to a mixture of lead and lead sulfate at the cathode.

Example 4

In this example, the $CO_2$ capacity of an ethylenediamine (EDA) solution was determined as a function of cupric nitrate ($Cu(NO_3)_2$) concentration, according to some embodiments. Experiments were conducted with an amine solution (40 mL) containing one molar ethylenediamine and one molar potassium nitrate with cupric nitrate concentrations ranging from 0 to 0.5 molar. The capacities were measured by contacting the amine solution with a 15% $CO_2$ (balance nitrogen) stream at 66 std. mL/min. The outlet composition of the gas was measured every 75 seconds with a gas chromatogram to determine how much $CO_2$ had been removed. Capacities were calculated after subtracting the dead volume of the system as calculated by running the experiment with a 1 M potassium nitrate solution with no amine.

These results demonstrate that, in some embodiments, the $CO_2$ capacity can be changed from equimolar with the ethylenediamine to near zero capacity at copper loadings of 0.5 mol $Cu^{2+}$ per mol EDA by changing the concentration of cupric ions in the solution. From this data, it can be determined that by electro-dissolution of a copper electrode, $CO_2$ can be released from an amine solution. In addition, electro-deposition of the copper back onto the electrode may regenerate the solution's $CO_2$ capacity.

Example 5 (Prophetic)

Figure 12A:
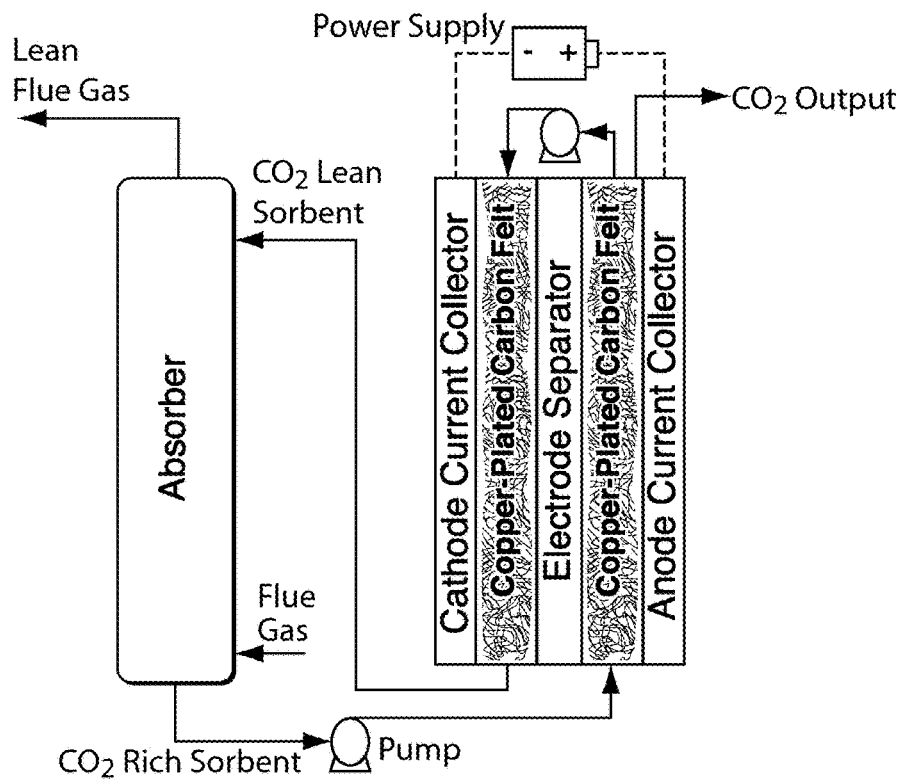
FIGS. 12a and 12b show a diagram and a photograph, respectively, for a system for capturing $CO_2$, according to some embodiments.
Figure 12B:
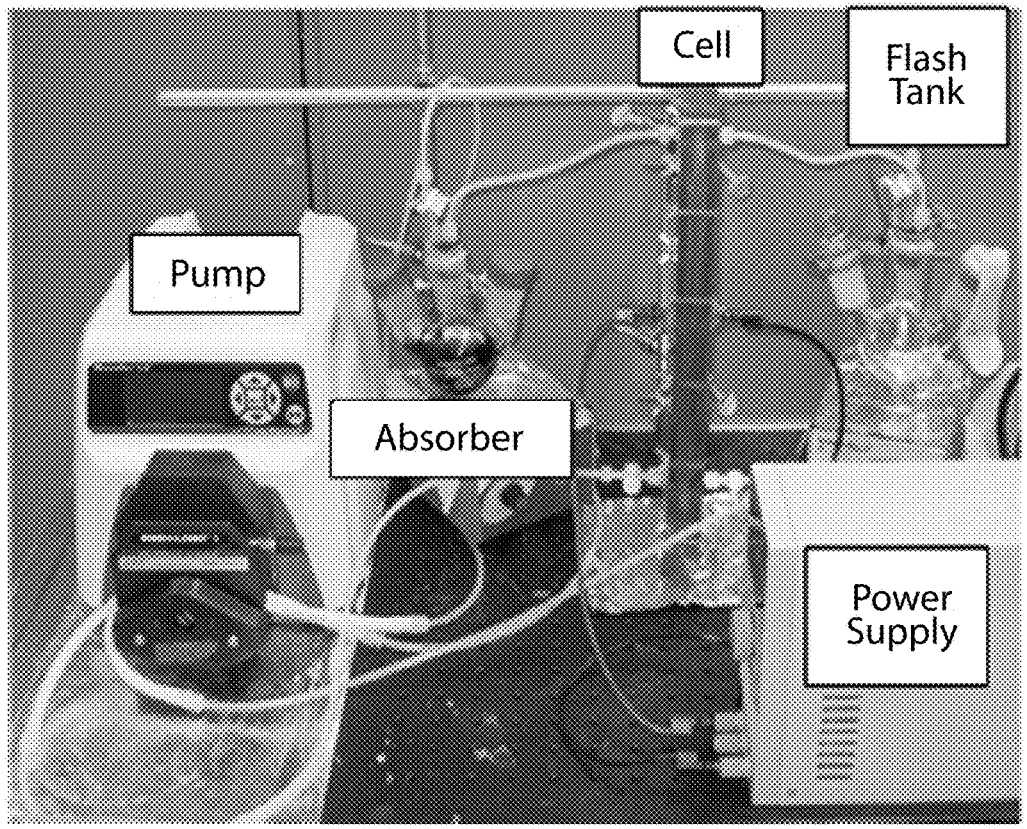

An aqueous ethylenediamine (e.g., 4 M), sodium chloride (e.g., 2 M), and cupric chloride (e.g., 1 M) working solution may be used to capture carbon dioxide from post-combustion flue gases of a fossil-fuel boiler or furnace. Particulates, sulfur oxides, and nitrogen oxides may be scrubbed before contact with the amine scrubbing system. The scrubbing system may contain an absorber similar to that which is currently used for acid gas scrubbing with amines. In some embodiments, in place of a thermal stripper, the saturated amine solution, containing dissolved carbon dioxide, may be pumped (e.g., at ten atmospheres of pressure) into an anode compartment of an electrochemical flow cell (e.g., see FIGS. 12a and 12b). A compartment (e.g., one centimeter thick) may be packed with a copper-plated carbon felt. The felt may be similar to carbon felt used in vanadium redox-flow batteries. Several cells may be stacked electrically in series, which may minimize the current and increase the voltage. A potential (e.g., 0.25 volts) may be applied to the anode (e.g., with respect to the cathode), which may cause the electro-dissolution of the copper on the carbon felt. This would react with the diamines and release the carbon dioxide from the solution. The gas bubbles would travel to the top of the flow cell and be directed towards a series of compressors. The now copper-loaded working solution may exit the anode and be pumped into the cathode. The anode and cathode may be separated by a thin ion-permeable separator. The cathode may be packed with a copper-plated carbon felt similar to the anode. In some embodiments, e.g., operated with a potential of about −0.25 volts (with respect to the anode), copper would be electro-deposited on the cathode thus removing it from the working solution. The current density of this system through the separator would be about 500 $A/m^2$. The solution leaving the cathode may then be released into the absorber, thereby completing the cycle. The electrochemical system may be operated at a suitable temperature (e.g., an average temperature of about 65° C.).

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed:

1. A system for carrying out a pH-influenced chemical and/or biological reaction, comprising:
  a pH-adjustment zone comprising a solution and an electrode exposed to the solution, wherein at least 30% of the electrode by weight comprises a complexation agent capable of associating and/or disassociating an acid and/or base to and/or from the solution upon exposure to a first electrical potential; and a reaction zone in fluid connection with the pH-adjustment zone, wherein the reaction zone comprises components and reagents for carrying out a pH-influenced chemical and/or biological reaction, wherein the complexation agent is configured to reverse the association and/or disassociation of the acid and/or the base upon exposure to a second electrical potential, different than the first electrical potential.

2. The system of claim 1, wherein the acid is a proton.

3. The system of claim 1, wherein the base is a hydroxide.

4. The system of claim 1, wherein the pH of the pH-selected solution is about 1, about 2, about 3, about 4, about 5, about 6, about 7, about 8, about 9, about 10, about 11, about 12, or about 13.

5. The system of claim 1, wherein the pH-adjustment zone comprises a first electrode and a second electrode.

6. The system of claim 5, wherein the first electrode is in a first compartment and the second electrode is in a second compartment.

7. The system of claim 6, wherein the first compartment and the second compartment are separated by a membrane.

8. The system of claim 7, wherein the membrane is an ion-selective membrane.

9. The system of claim 1, wherein the pH-adjustment zone and the reaction zone comprise a first container and a second, different, container.

10. The system of claim 1, wherein the pH-adjustment zone and the reaction zone are comprised in the same container.

11. The system of claim 1, wherein the pH-influenced biological and/or chemical reaction involves the conversion of $CO_2$ to a dissolved species.

12. The system of claim 1, wherein the change in pH of the solution is not due to water electrolysis.

13. The system of claim 1, wherein the complexation agent is a solute in the solution.

14. The system of claim 1, wherein the complexation agent is at least 30%, at least 40%, at least 50%, at least 60%, at least 70%, at least 80%, at least 90%, at least 95%, at least 98%, or at least 99%, of an electrode by weight.

15. The system of claim 1, wherein the complexation agent is selected from the group consisting of:

$$PbSO_4 + 2H_2O \Leftrightarrow PbO_2 + SO_4^{2-} + 4H^+ + 2e^-$$

$$Cu + 2OH^- \Leftrightarrow CuO + H_2O + 2e^-$$

$$Cu \Leftrightarrow Cu^{2+} + 2e^-$$

$$Cu^{2+} + 2OH^- \Leftrightarrow Cu(OH_2)$$

$$Cu + 2OH^- \Leftrightarrow Cu(OH)_2 + 2e^-$$

$$2Cu + O_2 + H_2O \Leftrightarrow 2Cu(OH)_2 \text{ or}$$

$$2Fe + O_2 + H_2O \Leftrightarrow 2Fe(OH)_2$$

16. The system of claim 1, wherein the system comprises a first type of complexation agent and a second type of complexation agent.

17. A method, comprising:

providing a system comprising a pH-adjustment zone and a reaction zone in fluid connection with the pH-adjustment zone, wherein the pH-adjustment zone comprises an electrode, wherein at least 30% of the electrode by weight comprises a complexation agent and wherein the reaction zone comprises components and reagents for carrying out a pH-influenced chemical and/or biological reaction;

exposing the complexation agent in the pH-adjustment zone to a first electrical potential, wherein the complexation agent associates and/or disassociates an acid and/or base to and/or from the solution upon exposure to the first electrical potential and causes the pH of the solution to increase or decrease, thereby forming a pH-selected solution having a selected pH; and flowing the pH-selected solution to the reaction zone, wherein the chemical and/or biological reaction is influenced by the pH of the pH-selected solution, and wherein the chemical and/or biological reaction causes the pH of the pH-selected solution to decrease or increase, wherein the complexation agent is configured to reverse the association and/or disassociation of the acid and/or the base upon exposure to a second electrical potential, different than the first electrical potential.

* * * * *